United States Patent
Oyama

(10) Patent No.: US 12,384,031 B2
(45) Date of Patent: Aug. 12, 2025

(54) CONTROL DEVICE, CONTROL METHOD AND STORAGE MEDIUM

(71) Applicant: NEC Corporation, Tokyo (JP)

(72) Inventor: Hiroyuki Oyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 227 days.

(21) Appl. No.: 17/801,919

(22) PCT Filed: Feb. 28, 2020

(86) PCT No.: PCT/JP2020/008331
§ 371 (c)(1),
(2) Date: Aug. 24, 2022

(87) PCT Pub. No.: WO2021/171558
PCT Pub. Date: Sep. 2, 2021

(65) Prior Publication Data
US 2023/0099683 A1    Mar. 30, 2023

(51) Int. Cl.
*B25J 9/16*    (2006.01)

(52) U.S. Cl.
CPC ............. *B25J 9/1661* (2013.01); *B25J 9/161* (2013.01); *B25J 9/163* (2013.01)

(58) Field of Classification Search
CPC ........... B25J 9/1661; B25J 9/161; B25J 9/163
See application file for complete search history.

(56) References Cited

U.S. PATENT DOCUMENTS

| | | | |
|---|---|---|---|
| 7,555,742 B2 * | 6/2009 | Iborra | G06F 8/35 717/101 |
| 10,671,076 B1 * | 6/2020 | Kobilarov | G08G 1/166 |
| 2003/0002447 A1 | 1/2003 | Jackson et al. | |
| 2009/0150142 A1 | 6/2009 | Lee et al. | |
| 2018/0085922 A1 | 3/2018 | Ooba | |
| 2020/0164514 A1 * | 5/2020 | Kaneko | B25J 9/1633 |
| 2020/0379893 A1 * | 12/2020 | Arechiga Gonzalez | G06F 30/15 |
| 2020/0398427 A1 * | 12/2020 | Kupcsik | B25J 9/163 |
| 2021/0065027 A1 | 3/2021 | Yamamoto | |
| 2021/0078172 A1 * | 3/2021 | Cao | G06F 3/04847 |
| 2021/0154846 A1 * | 5/2021 | Watanabe | B25J 9/1666 |

(Continued)

FOREIGN PATENT DOCUMENTS

| | | | |
|---|---|---|---|
| JP | H04-123231 A | 4/1992 | |
| JP | H06-337709 A | 12/1994 | |

(Continued)

OTHER PUBLICATIONS

"Multirobot coordination with counting temporal logics" by Sahin (Year: 2018).*

(Continued)

*Primary Examiner* — Sohana Tanju Khayer

(57) ABSTRACT

A control device 1B mainly includes a subgoal setting means 17B and an operation sequence generation means 18B. The subgoal setting means 17B is configured to set a subgoal "Sg" based on abstract states in which states in a workspace where a robot works are abstracted, the subgoal Sg indicating an intermediate goal for achieving a final goal or constraint conditions required to achieve the final goal. The operation sequence generation means 18B is configured to generate an operation sequence to be executed by the robot based on the subgoal.

10 Claims, 14 Drawing Sheets

(56) References Cited

U.S. PATENT DOCUMENTS

2021/0252714 A1* 8/2021 Hayashi ................ B25J 13/00
2022/0055217 A1* 2/2022 Buerger ........... G05B 19/41815
2022/0258336 A1* 8/2022 Okawa ................. B25J 9/1664

FOREIGN PATENT DOCUMENTS

| JP | 2003-029803 A | 1/2003 |
|---|---|---|
| JP | 2003-175480 A | 6/2003 |
| JP | 2009-140348 A | 6/2009 |
| JP | 2018-051684 A | 4/2018 |
| WO | 2019/138458 A1 | 7/2019 |

OTHER PUBLICATIONS

"Combining spatial and temporal logics" expressiveness vs complexity by Gabelaia (Year: 2005).*

International Search Report for PCT Application No. PCT/JP2020/008331, mailed on Mar. 31, 2020.
Nomura Takumi et al., "Dynamic Hierarchy of Reinforcement Learning by Subgoals Emergence under POMDP", IPSJ, 2015, p. 339-340.
Haba Toshiaki et al., "An Expert System for Switch Operation Planning on Line Dispatching",Transactions of the Institute of Electrical Engineers of Japan, vol. 113-B, No. 2, 1993, pp. 159-167.
Extended European Search Report for EP Application No. EP20920904.8 dated on Feb. 28, 2023.
Carnes, J R et al.: "Task Planning for Autonomous Control Systems", Proceedings of the International Symposium on Intelligent Control. Arlington, Aug. 13-15, 1991.
Elmaraghy, H A et al.: "Roboplan: An AI-Based Robot Task Planner for Assembly", Manufacturing Review, American Society of Mechanical Engineers, New York, US, vol. 4, No. 4, Dec. 1, 1991 (Dec. 1, 1991).
JP Office Action for JP Application No. 2022-502778, mailed on Apr. 4, 2023 with English Translation.

* cited by examiner

CONTROL DEVICE, CONTROL METHOD AND STORAGE MEDIUM

This application is a National Stage Entry of PCT/JP2020/008331 filed on Feb. 28, 2020, the contents of all of which are incorporated herein by reference, in their entirety.

TECHNICAL FIELD

The present invention relates to a technical field of a control device, a control method, and a storage medium for controlling the operation of a robot.

BACKGROUND ART

There is proposed such a control method to perform control of a robot necessary for executing the task when a task to be performed by a robot is given. For example, Patent Literature 1 discloses a robot controller configured, when placing a plurality of objects in a container by a robot with a hand for gripping an object, to determine possible orders of gripping the objects by the hand and to determine the order of the objects to be placed in the container based on the index calculated with respect to each of the possible orders.

CITATION LIST

Patent Literature

Patent Literature 1: JP 2018-51684A

SUMMARY

Problem to be Solved

When a robot executes a given task, depending on the given task, the number of time steps needed to the complete the task becomes large, and therefore the computational complexity for calculating the optimal operation sequence to be executed by the robot could become enormous.

In view of the above-described issue, it is therefore an example object of the present disclosure to provide a control device, a control method, and a storage medium capable of suitably generating an operation sequence of a robot.

Means for Solving the Problem

In one mode of the control device, there is provided a control device including: a subgoal setting means configured to set a subgoal based on abstract states in which states in a workspace where a robot works are abstracted, the subgoal indicating an intermediate goal for achieving a final goal or constraint conditions required to achieve the final goal; an operation sequence generation means configured to generate an operation sequence to be executed by the robot based on the subgoal.

In one mode of the control method, there is provided a control method executed by a computer, the control method including: setting a subgoal based on abstract states in which states in a workspace where a robot works are abstracted, the subgoal indicating an intermediate goal for achieving a final goal or constraint conditions required to achieve the final goal; generating an operation sequence to be executed by the robot based on the subgoal.

In one mode of the storage medium, there is provided a storage medium storing a program executed by a computer, the program causing the computer to function as: a subgoal setting means configured to set a subgoal based on abstract states in which states in a workspace where a robot works are abstracted, the subgoal indicating an intermediate goal for achieving a final goal or constraint conditions required to achieve the final goal; an operation sequence generation means configured to generate an operation sequence to be executed by the robot based on the subgoal.

Effect

An example advantage according to the present invention is to suitably generate an operation sequence of a robot.

EXAMPLE EMBODIMENTS

Hereinafter, example embodiments of a control device, a control method, and a storage medium will be described with reference to the drawings.

First Example Embodiment (1) System Configuration

Figure 1:
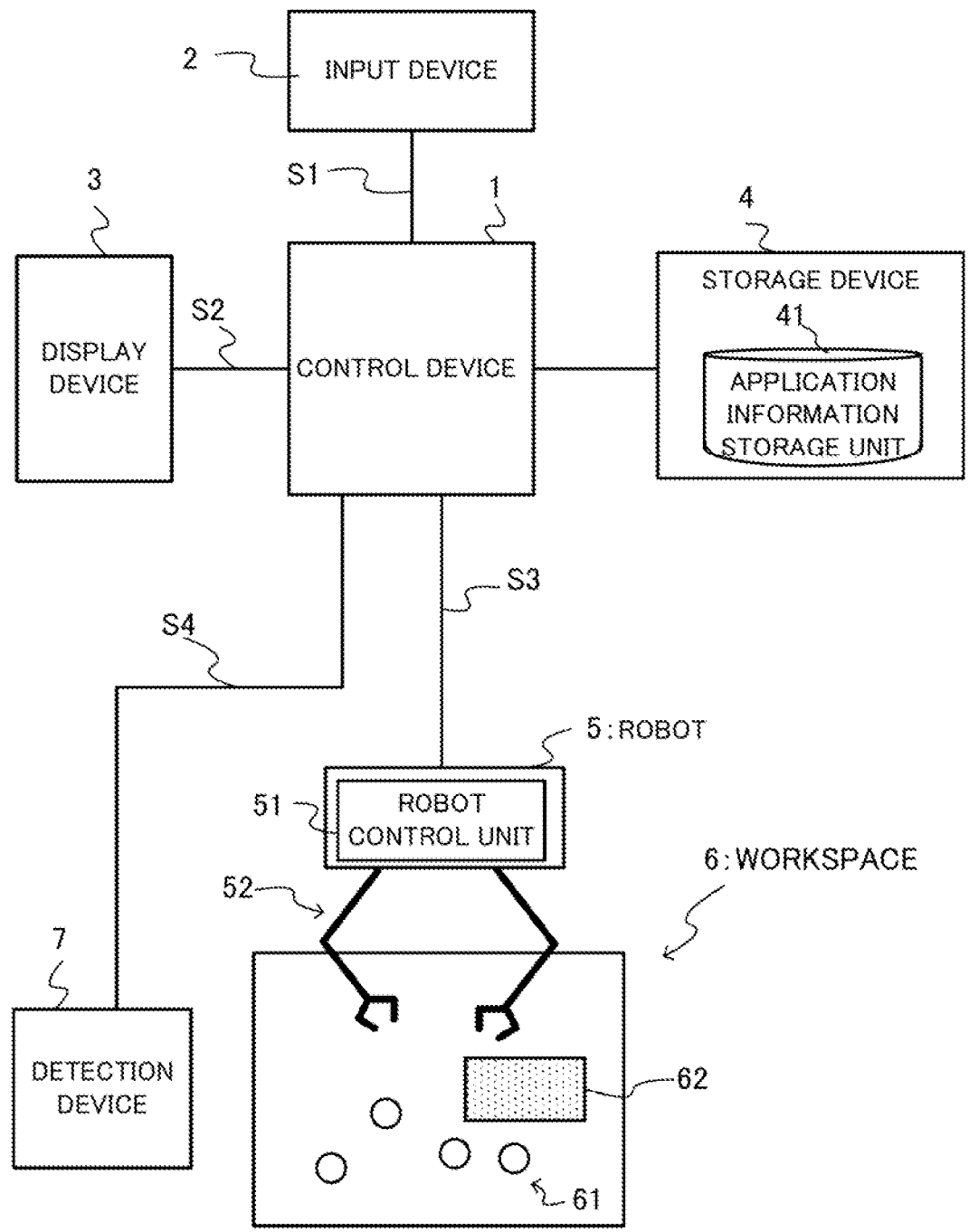
FIG. 1 illustrates the configuration of a robot control system.

FIG. 1 shows a configuration of a robot control system 100 according to the first example embodiment. The robot control system 100 mainly includes a control device 1, an input device 2, a display device 3, a storage device 4, a robot 5, and a detection device 7.

When a task (also referred to as "objective task") to be performed by the robot 5 is specified, the information processing device 1 converts the objective task into a time step sequence of simple tasks each of which the robot 5 can accept, and supplies the sequence to the robot 5. Hereafter, a simple task in units of command that can be accepted by the robot 5 is also referred to as "subtask" and a sequence of subtasks to be executed by each of the robots 5 in order to achieve the objective task is referred to as "subtask sequence". The subtask sequence corresponds to an operation sequence which defines a series of operations to be executed by the robot 5.

The control device 1 performs data communication with the input device 2, the display device 3, the storage device 4, the robot 5 and the detection device 7 via a communication network or by wired or wireless direct communication. For example, the control device 1 receives an input signal "S1" for specifying the objective task from the input device 2. Further, the control device 1 transmits, to the display device 3, a display signal "S2" for performing a display relating to the task to be executed by the robot 5. The control device 1 transmits a control signal "S3" relating to the control of the robot 5 to the robot 5. The control device 1 receives the detection signal "S4" from the detection device 7.

The input device 2 is an interface that accepts the input from the user and examples of the input device 2 include a touch panel, a button, a keyboard, and a voice input device. The input device 2 supplies an input signal S1 generated based on the user's input to the control device 1. The display device 3 displays information based on the display signal S2 supplied from the control device 1 and examples of the display device 3 include a display and a projector.

The storage device 4 includes an application information storage unit 41. The application information storage unit 41 stores application information necessary for generating a sequence of subtasks from the objective task. Details of the application information will be described later with reference to FIG. 3. The storage device 4 may be an external storage device such as a hard disk connected to or built in to the control device 1, or may be a storage medium such as a flash memory. The storage device 4 may be a server device that performs data communication with the control device 1. In this case, the storage device 4 may include a plurality of server devices.

The robot 5 operates to execute the objective task under the control of the control unit 1. The robot 5 shown in FIG. 1 is equipped with, as an example, two robot arm 52 subjected to control each capable of gripping an object as a control object, and performs pick-and-place (picking up and moving process) of the target objects 61 present in the workspace 6. The robot 5 is equipped with a robot control unit 51. The robot control unit 51 performs operation control of each robot arm 52 based on a subtask sequence specified for each robot arm 52 by the control signal S3.

The workspace 6 is a workspace where the robot 5 works. In the workspace 6 shown in FIG. 1, there are a plurality of target objects 61 to be handled by the robot 5, an obstacle 62 which is an obstacle in the work by the robot 5, and the robot arms 52.

The detection device 7 is one or more sensors configured to detect the state of the workspace 6 and examples of the sensors include a camera, a range finder sensor, a sonar, and a combination thereof. The detection device 7 supplies the generated detection signal S4 to the control device 1. The detection signal S4 may be image data showing the workspace 6, or it may be a point cloud data indicating the position of objects in the workspace 6. The detection device 7 may be a self-propelled sensor or a flying sensor (including a drone) that moves within the workspace 6. Examples of the detection device 7 may also include a sensor provided in the robot 5 and a sensor provided at any other machine tool such as conveyor belt machinery present in the workspace 6. The detection device 7 may also include a sensor for detecting sounds in the workspace 6. Thus, the detection device 7 is a variety of sensors for detecting the state in the workspace 6, and it may be a sensor provided at any location.

The configuration of the robot control system 100 shown in FIG. 1 is an example, and various changes may be performed to the configuration. For example, the robot 5 may be plural robots. Further, the robot 5 may include only one or three or more robot arms 52. Even in these cases, the control device 1 generates a subtask sequence to be executed for each robot 5 or each robot arm 52 based on the objective task, and transmits a control signal S3 indicating the subtask sequence to each robot 5. The detection device 7 may be a part of the robot 5. Further, the robot control unit 51 may be configured separately from the robot 5 or may be incorporated in the control device 1. Further, the input device 2 and the display device 3 may be included in the control device 1 (e.g., a tablet terminal) in such a state that they are incorporated in the control device 1. Further, the control device 1 may be configured by a plurality of devices. In this case, the plurality of devices that function as the control device 1 exchange information necessary to execute the pre-allocated process with one another. Further, the robot 5 may incorporate the function of the control device 1.

Figure 2:
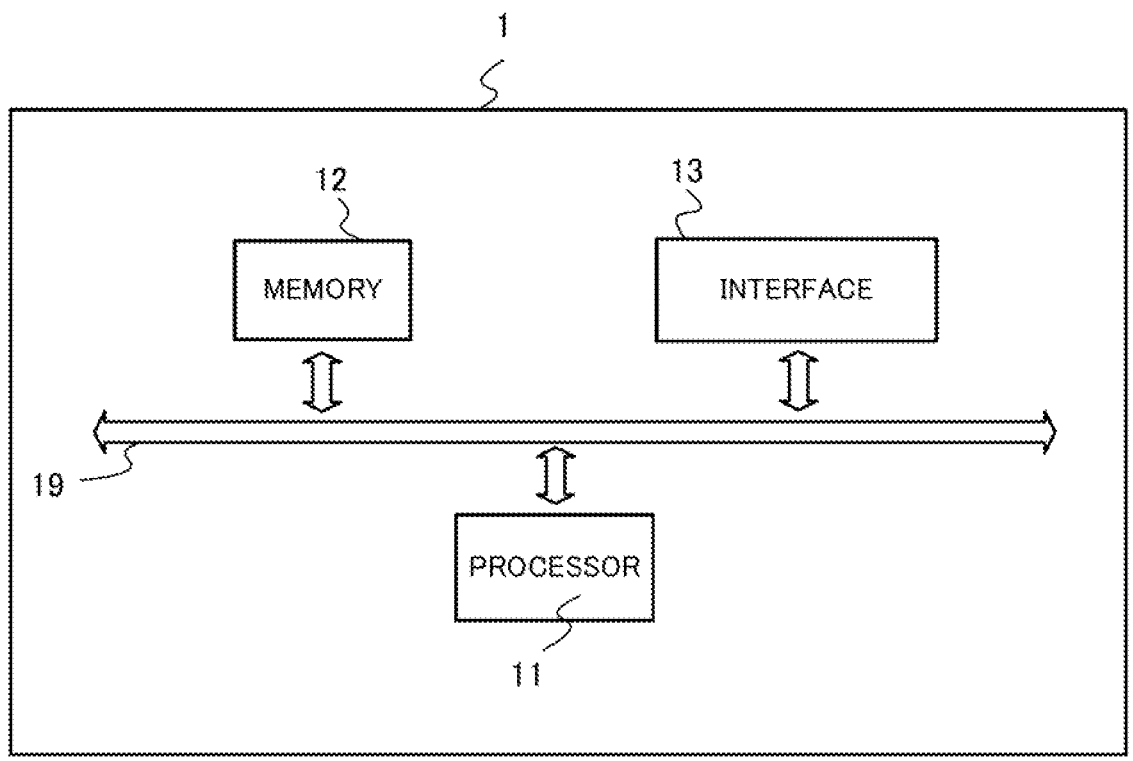
FIG. 2 illustrates the hardware configuration of a control device.

(2) Hardware Configuration of Control Device FIG. 2 shows a hardware configuration of the control device 1. The control device 1 includes, as hardware, a processor 11, a memory 12, and an interface 13. The processor 11, the memory 12, and the interface 13 are connected via a data bus 19 to one another.

The processor 11 executes a predetermined process by executing a program stored in the memory 12. The processor 11 is one or more processors such as a CPU (Central Processing Unit) and a GPU (Graphics Processing Unit).

The memory 12 is configured by various volatile and non-volatile memories such as a RAM (Random Access Memory) and a ROM (Read Only Memory). Further, the memory 12 stores a program for the control device 1 to execute a predetermined process. The memory 12 is used as a work memory and temporarily stores information acquired from the storage device 4.

The memory 12 may function as a storage device 4. In contrasts, the storage device 4 may function as the memory 12 of the control device 1. The program executed by the control device 1 may be stored in a storage medium other than the memory 12.

The interface 13 is an interface for electrically connecting the control device 1 to other external devices. For example, the interface 13 includes an interface for connecting the control device 1 to the input device 2, an interface for connecting the control device to the display device 3, and an interface for connecting the control device 1 to the storage device 4. The interface 13 includes an interface for connecting the control device 1 to the robot 5, and an interface for connecting the control device 1 to the detection device 7. These connections may be wired connections or may be wireless connections. For example, the interface for connecting the control device 1 to these external devices may be a communication interface for wired or wireless transmission and reception of data to and from these external devices under the control of the processor 11. In another example, the control device 1 and the external devices may be connected by a cable or the like. In this case, the interface 13 includes an interface which conforms to an USB (Universal Serial Bus), a SATA (Serial AT Attachment), or the like for exchanging data with the external devices.

The hardware configuration of the control device 1 is not limited to the configuration shown in FIG. 2. For example, the control device 1 may include at least one of an input device 2, a display device 3, and a storage device 4. Further, the control device 1 may be connected to or incorporate a sound output device such as a speaker. In these cases, the control device 1 may be a tablet-type terminal or the like in which the input function and the output function are integrated with the main body.

(3) Application Information Next, a data structure of the application information stored in the application information storage unit 41 will be described.

Figure 3:
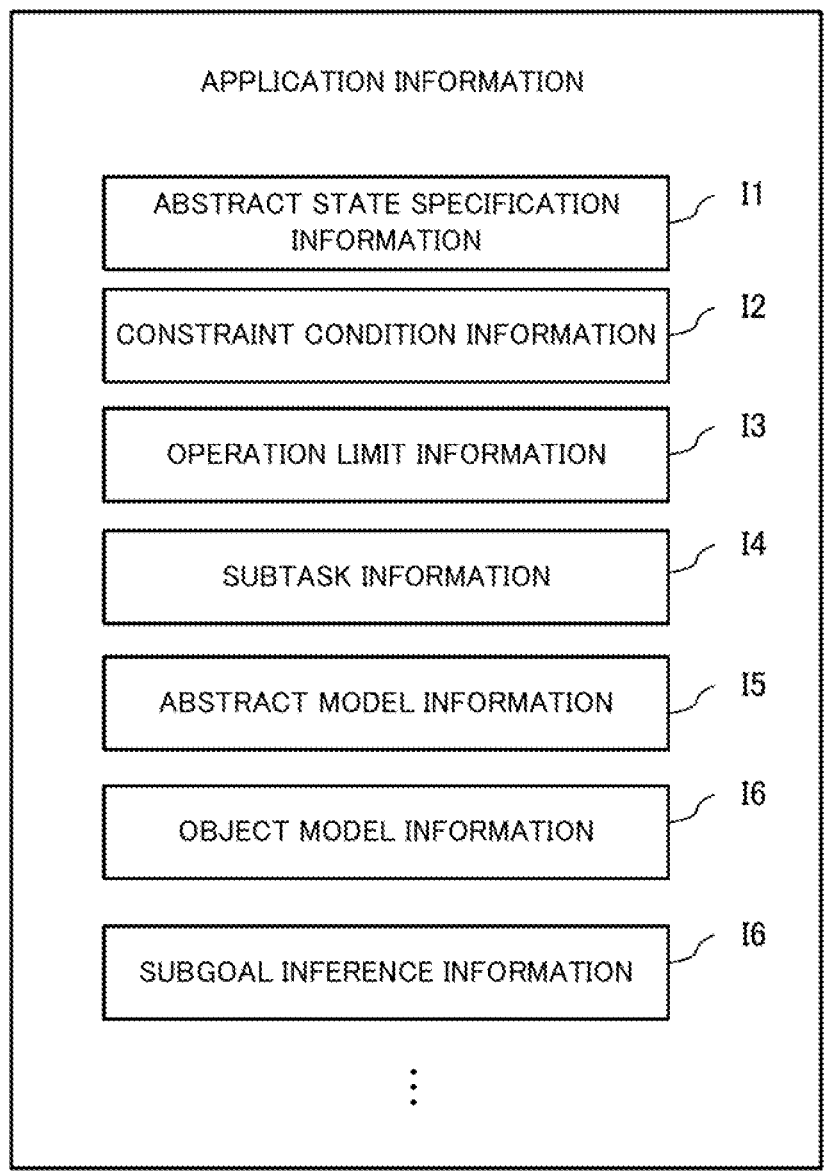
FIG. 3 illustrates an example of the data structure of application information.

FIG. 3 shows an example of a data structure of application information stored in the application information storage unit 41. As shown in FIG. 3, the application information storage unit 41 includes abstract state specification information I1, constraint condition information 12, operation limit information 13, subtask information 14, abstract model information I5, object model information 16, and subgoal inference information 17.

The abstract state specification information I1 specifies abstract states to be defined in order to generate the subtask sequence. The above-mentioned abstract states are abstract states of objects in the workspace 6, and are defined as propositions to be used in the target logical formula to be described later. For example, the abstract state specification information I1 specifies the abstract states to be defined for each type of objective task. The objective task may be various types of tasks such as pick-and-place, capture of moving object(s) and turn of a screw.

The constraint condition information 12 indicates constraint conditions of performing the objective task. The constraint condition information 12 indicates, for example, a constraint that the robot 5 (robot arm 52) must not be in contact with an obstacle when the objective task is pick-and-place, and a constraint that the robot arms 52 must not be in contact with each other, and the like. The constraint condition information 12 may be information in which the constraint conditions suitable for each type of the objective task are recorded.

The operation limit information 13 is information on the operation limit of the robot 5 to be controlled by the information processing device 1. For example, the operation limit information 13 is information on the upper limit (e.g., in the case of the robot 5 shown in FIG. 1, the maximum speed of reaching of the robot arm 52, etc.,) of the speed, acceleration, or the angular velocity of the robot 5. The operation limit information 13 may be information defining the operation limit for each movable portion or joint of the robot 5.

The subtask information 14 indicates information on subtasks that the robot 5 can accept. For example, when the objective task is pick-and-place, the subtask information 14 defines a subtask "reaching" that is the movement of the robot arm 52, and a subtask "grasping" that is the grasping by the robot arm 52. The subtask information 14 may indicate information on subtasks that can be used for each type of objective task.

The abstract model information I5 is information on an abstract model in which the dynamics in the workspace 6 is abstracted. The abstract model is represented by a model in which real dynamics is abstracted by a hybrid system, as will be described later. The abstract model Information I5 includes information indicative of the switching conditions of the dynamics in the above-mentioned hybrid system. For example, one of the switching conditions in the case of the pick-and-place shown in FIG. 1 is that the target object 61 cannot be moved unless it is gripped by the hand of the robot arm 52. The abstract model information I5 includes information on an abstract model suitable for each type of the objective task.

The object model information 16 is information relating to an object model of each object (in the example shown in FIG. 1, the robot arms 52, the objects 61, the obstacle 62, and the like) to be recognized from the detection signal S4 generated by the detection device 7. For example, the object model information 16 includes: information which the control device 1 requires to recognize the type, the position, the posture, the ongoing (currently-executing) operation and the like of the each object described above; and three-dimensional shape information such as CAD (Computer Aided Design) data for recognizing the three-dimensional shape of the each object. The former information includes the parameters of an inference engine obtained by learning a learning model that is used in a machine learning such as a neural network. For example, the above-mentioned inference engine is learned in advance to output the type, the position, the posture, and the like of an object shown in the image when an image is inputted thereto.

The subgoal inference information 17 is information required to determine an intermediate goal (also referred to as "subgoal Sg") for the robot 5 to achieve the objective task. In this example embodiment, the subgoal inference information 17 includes the information on parameters of an inference engine (also referred to as "subgoal inference engine") generated by machine learning. The subgoal inference engine is learned to output, when abstract states that are abstracted states in the workspace 6 and a final goal representing the achievement state of the objective task are inputted thereto, one or more subgoals Sg necessary to achieve the final goal in the abstract states. The learning model used for the subgoal inference engine may be a learning model according to any of various machine learning based on a neural network, a support vector machine, a Gaussian process, a variational auto encoder, or a combination thereof. For example, if the learning model described above is based on a neural network such as a convolutional neural network, the subgoal inference information 17 stores various parameters such as layer structure, neuron structure of each layer, the number of filters and filter sizes in each layer, and the weight of each element of each filter. It is noted that the subgoal inference engine may be configured to output one or more parameters for defining the subgoal Sg, or may be configured to output an appropriate subgoal Sg selected from a plurality of subgoals Sg prepared in advance.

In addition to the information described above, the application information storage unit 41 may store various kinds of information related to the generation process of the subtask sequence.

Figure 4:
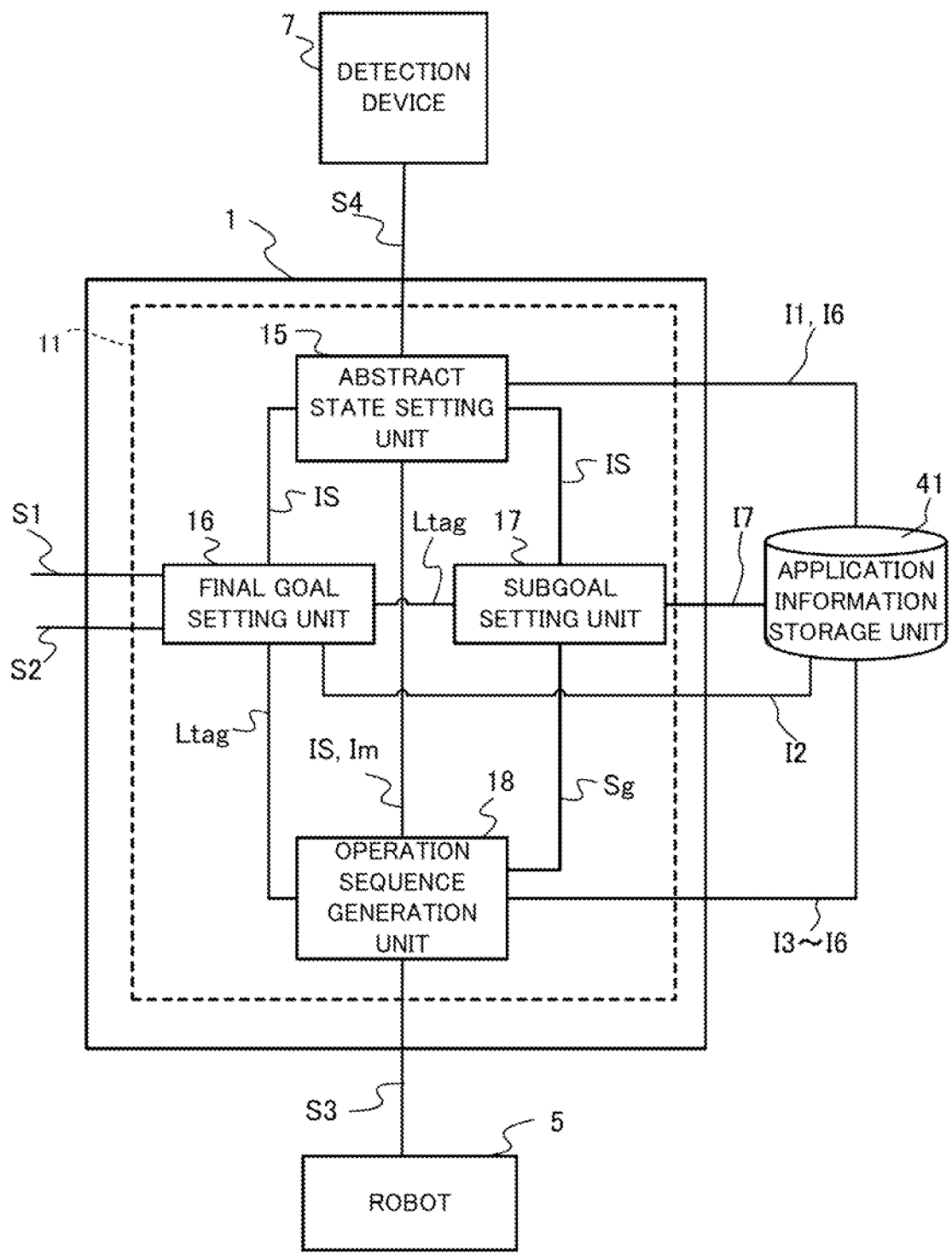
FIG. 4 is an example of a functional block of the control device in the first example embodiment.

(4) Process Overview of Control Unit FIG. 4 is an example of a functional block showing an outline of the process executed by the control device 1. The processor 11 of the control device 1 functionally includes an abstract state setting unit 15, a final goal setting unit 16, a subgoal setting unit 17, and an operation sequence generation unit 18. In FIG. 4, an example of data to be transmitted and received between the blocks is shown, but is not limited thereto. The same applies to diagrams of other functional blocks to be described later.

The abstract state setting unit 15 recognizes, based on the detection signal S4 supplied from the detection device 7 and the object model information 16 or the like, the state in the workspace of the robot 5, and generates information (also referred to as "state information Im") on the recognized state of the workspace of the robot 5. Further, based on the state information Im and the abstract state designation information I1, the abstract state setting unit 15 sets abstract states that are abstracted states in the workspace 6 where the robot 5 works. In this case, the abstract state setting unit 15 defines a proposition for each abstract state to be expressed in a logical formula. The abstract state setting unit 15 supplies information (also referred to as "abstract state setting information IS") indicating the set abstract states to the final goal setting unit 16, the subgoal setting unit 17, and the operation sequence generation unit 18, respectively. Instead of the abstract state setting unit 15 generating the state information Im, the detection device 7 may generate the state information Im. In this case, the abstract state setting unit 15 generates the abstract state setting information IS based on the state information Im supplied from the detection device 7.

When receiving the input signal S1 specifying the objective task from the input device 2, the final goal setting unit 16 converts, based on the abstract state setting information IS, the objective task indicated by the input signal S1 into a logical formula (also referred to as "final goal logical formula Ltag"), in the form of a temporal logic, representing the final state to be achieved. Besides, by referring to the constraint condition information 12 from the application information storage unit 41, the final goal setting unit 16 adds the constraint conditions to be satisfied in executing the objective task to the final goal logical formula Ltag. Then, the final goal setting unit 16 supplies the generated final goal logical formula Ltag to the subgoal setting unit 17 and the operation sequence generation unit 18. Further, the final goal setting unit 16 generates a display signal S2 for displaying a view for receiving an input relating to the objective task, and supplies the display signal S2 to the display device 3.

Instead of recognizing the objective task based on the input signal S1, the final goal setting unit 16 may recognize the objective task by referring to the application information storage unit 41. In this case, for example, in the application information storage unit 41, there are registered objective tasks each associated with a predetermined gesture, voice instruction, or other predetermined event. Then, when detecting, based on the detection signal S4, a predetermined gesture, voice instruction, or other predetermined event, the final goal setting unit 16 determines that the objective task corresponding to the detected one should be executed.

The subgoal setting unit 17 sets one or more subgoals Sg for the specified objective task based on the abstract state setting information IS supplied from the abstract state setting unit 15 and the final goal logical formula Ltag supplied from the final goal setting unit 16. In this case, the subgoal setting unit 17 configures a subgoal inference engine by referring to the subgoal inference information 17, and recognizes the subgoal Sg to be set based on the inference result obtained by inputting the abstract state setting information IS and the final goal logical formula Ltag to the subgoal inference engine. Then, the subgoal setting unit 17 supplies the subgoal Sg to be set to the operation sequence generation unit 18.

The operation sequence generation unit 18 generates a subtask sequence to be executed by the robot 5 based on the final goal logical formula Ltag, the state information Im, the abstract state setting information IS, the subgoal Sg, and the application information. In this case, the operation sequence generation unit 18 determines the subtask sequence, for achieving both of the final goal logical formula Ltag and the subgoal Sg supplied from the subgoal setting unit 17, by optimizing an evaluation function (objective function). In this case, the operation sequence generation unit 18 can suitably reduce the calculation amount of the optimization as compared with the case where the subgoal Sg is not set.

Each component of the abstract state setting unit 15, the final goal setting unit 16, the subgoal setting unit 17, and the operation sequence generation unit 18 described in FIG. 4 can be realized, for example, by the processor 11 executing the program. More specifically, each component may be implemented by the processor 11 executing a program stored in the memory 12 or the storage device 4. In addition, the necessary programs may be recorded in any nonvolatile recording medium and installed as necessary to realize each component. Each of these components is not limited to being implemented by software using a program, and may be implemented by any combination of hardware, firmware, and software. Each of these components may also be implemented using user programmable integrated circuit, such as, for example, FPGA (field-programmable gate array) or a microcomputer. In this case, the integrated circuit may be used to realize a program to function as each of the above-described components. Thus, each component may be implemented by hardware other than the processor.

The above is the same in other example embodiments to be described later.

(5) Details of Abstract State Setting Unit

When receiving the detection signal S4 from the detection device 7, the abstract state setting unit 15 refers to the object model information 16 and the like and thereby analyzes the detection signal S4 by using a technique (an image processing technique, an image recognition technique, a speech recognition technique, a technique using a RFID (Radio Frequency Identifier)) for recognizing the state in the workspace. Thereby, the abstract state setting unit 15 recognizes the number of objects for each type, the position and the posture of each object in the workspace related to the execution of the task, and generates the state information Im including the recognition result. With reference to the abstract state specification information I1, the abstract state setting unit 15 recognizes abstract states to be set in the workspace 6 thereby to set the abstracts states in the workspace 6 based on the state information Im. The abstract states to be set in the workspace 6 varies depending on the type of the objective task. Therefore, when the abstract states to be set are defined for each type of the objective task in the abstract state specification information I1, the abstract state setting unit 15 refers to the abstract state specification information I1 corresponding to the objective task specified by the input signal S1 and recognizes the abstract states to be set.

Figure 5:
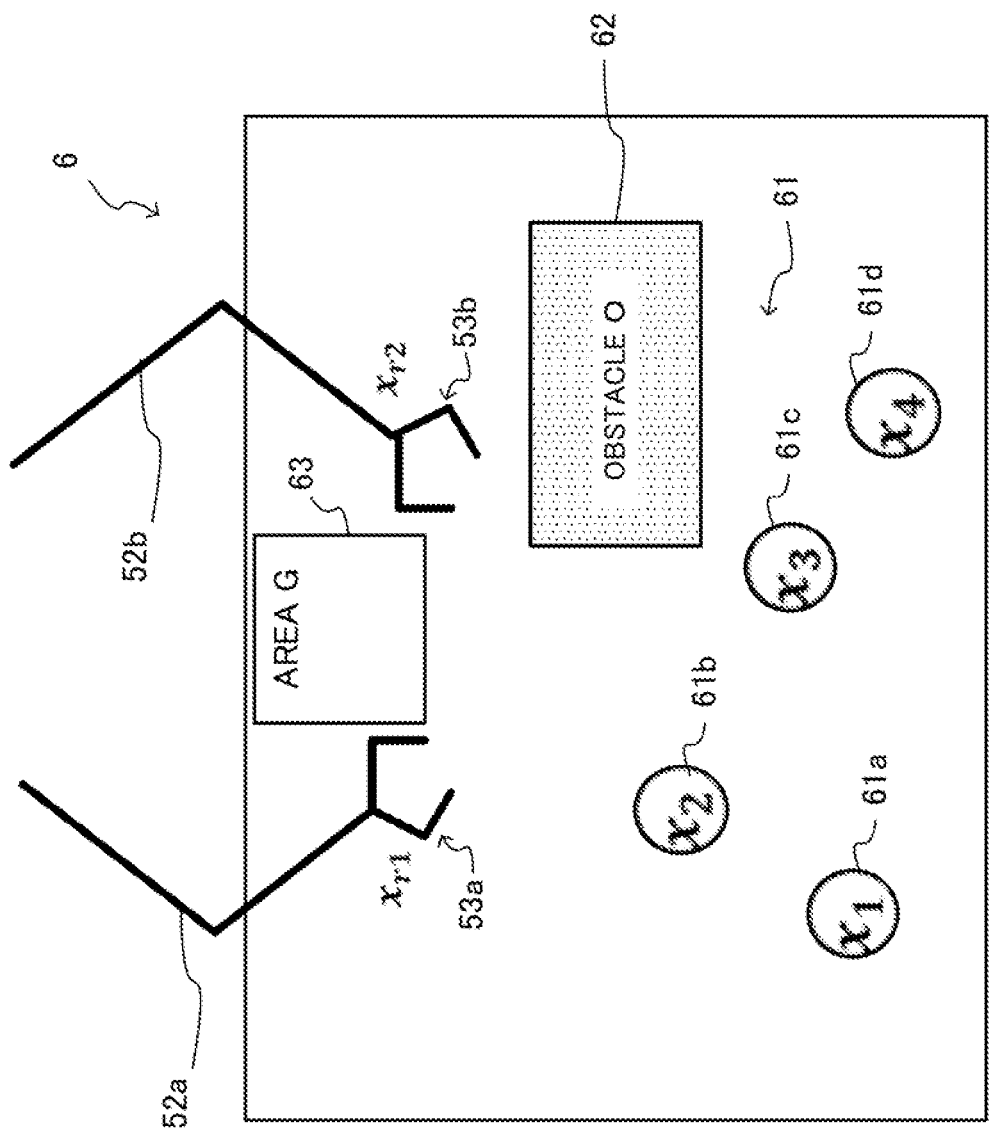
FIG. 5 illustrates a bird's-eye view of the workspace.

FIG. 5 shows a bird's-eye view of the workspace 6. In the workspace 6 shown in FIG. 5, there are two robot arms 52a and 52b, four target objects 61a to 61d, and an obstacle 62.

In this case, by analyzing the detection signal S4 received from the detection device 7 using the object model information 16, the abstract state setting unit 15 recognizes each state of the target objects 61, the presence range of the obstacle 62, the presence range of the area G set as a goal point, and the like. Here, the abstract state setting unit 15 recognizes the position vectors "$x_1$" to "$x_4$" indicative of the centers of the target objects 61a to 61d as the positions of the target objects 61a to 61d, respectively. Further, the abstract state setting unit 15 recognizes the position vector "$x_{r1}$" of the robot hand 53a for grasping a target object as the position of the robot arm 52a and the position vector "$x_{r2}$" of the robot hand 53b for grasping a target object as the position of the robot arm 52b. Similarly, the abstract state setting unit 15 recognizes the postures of the target objects

61*a* to 61*d* (it is unnecessary in the example of FIG. 5 because each target object is spherical), the presence range of the obstacle 62, the presence range of the area G, and the like. For example, when assuming that the obstacle 62 is a rectangular parallelepiped and the area G is a rectangle, the abstract state setting unit 15 recognizes the position vector of each vertex of the obstacle 62 and the area G. Then, the abstract state setting unit 15 generates the state information Im indicative of these recognition results that are based on the detection signal S4.

The abstract state setting unit 15 determines each abstract state to be defined in the objective task by referring to the abstract state specification information I1. In this case, the abstract state setting unit 15 recognizes the objects and areas existing in the workspace 6 and then determines a proposition indicating each abstract state on the basis of the recognition results (e.g., the number of the objects and the area(s) for each type) relating to the objects and the area(s) and the abstract state specification information I1.

In the example shown in FIG. 5, the abstract state setting unit 15 assigns identification labels "1" to "4" to the target objects 61*a* to 61*d* specified by the state information Im, respectively. Further, the abstract state setting unit 15 defines a proposition "$g_i$" that the target object "i" (i=1 to 4) is present in the area G (see the broken line frame 63) that is the goal point to be finally placed. Further, the abstract state setting unit 15 defines an identification label "O" to the obstacle 62, and defines the proposition "$o_i$" that the target object i interferes with the obstacle O. Furthermore, the abstract state setting unit 15 defines a proposition "h" that a robot arm 52 interferes with another robot arm 52.

Thus, by referring to the abstract state specification information I1, the abstract state setting unit 15 recognizes the abstract states to be defined, and defines the propositions ($g_i$, $o_i$, h in the above-described example) representing the abstract states according to the number of the target objects 61, the number of the robot arms 52, the number of the obstacles 62, and the like.

Then, the abstract state setting unit 15 generates information indicating the propositions representing the abstract states as the abstract state setting information IS.

(6) Details of Final Goal Setting Unit

First, the final goal setting unit 16 converts the objective task specified by the input signal S1 into a logical formula in the form of a temporal logic. The input signal S1 may be represented by a natural language. It is noted that there are various existing technologies for the method of converting tasks expressed in natural language into logical formulas. For example, in the example of FIG. 5, it is herein assumed that the objective task "the target object (i=2) is finally present in the area G" is given. In this case, the final goal setting unit 16 generates the logical formula "$\Diamond g_2$" which represents the objective task by using the operator "$\Diamond$" corresponding to "eventually" of the linear logical formula (LTL: Linear Temporal Logic) and the proposition "$g_i$" defined by the abstract state setting unit 15. The final goal setting unit 16 may express the logical formula by using any operators based on the temporal logic other than the operator "$\Diamond$" such as logical AND "$\wedge$", logical OR "$\vee$", negative "$\neg$", logical implication "$\Rightarrow$", always "$\Box$", next "o", until "U", etc.). The logical formula may be expressed by any temporal logic other than linear temporal logic such as MTL (Metric Temporal Logic) and STL (Signal Temporal Logic).

Next, the final goal setting unit 16 generates the final goal logical formula Ltag obtained by adding the constraint conditions indicated by the constraint condition information 12 to the logical formula representing the objective task.

For example, provided that two constraint conditions "the robot arms 52 does not interfere with each other" and "the target object i does not interfere with the obstacle O" for pick-and-place are included in the constraint condition information 12, the final goal setting unit 16 converts these constraint conditions into logical formulas. Specifically, the final goal setting unit 16 converts the above-described two constraint conditions into the following logical formulas by using the proposition "$o_i$" and the proposition "h" defined by the abstract state setting unit 15 according to the description relating to FIG. 5.

$$\Box \neg h$$

$$\wedge_i \Box \neg o_i$$

Therefore, in this case, the final goal setting unit 16 generates the following target logical formula Ltag obtained by adding the logical formulas of these constraint conditions to the logical formula "$\Diamond g_2$" corresponding to the objective task "the target object (i=2) is eventually present in the area G".

$$(\Diamond g_2) \wedge (\Box \neg h) \wedge (\wedge_i \Box \neg o_i)$$

In practice, the constraint conditions corresponding to the pick-and-place are not limited to the above-described two constraint conditions and there are other constraint conditions such as "a robot arm 52 does not interfere with the obstacle O", "plural robot arms 52 do not grasp the same target object", and "target objects does not contact with each other". Such constraint conditions are also stored in the constraint condition information 12 and are reflected in the final goal logical formula Ltag.

(7) Learning of Subgoal Inference Information

Next, the learning of the subgoal inference information 17 to be used by the subgoal setting unit 17 will be described.

Figure 6:
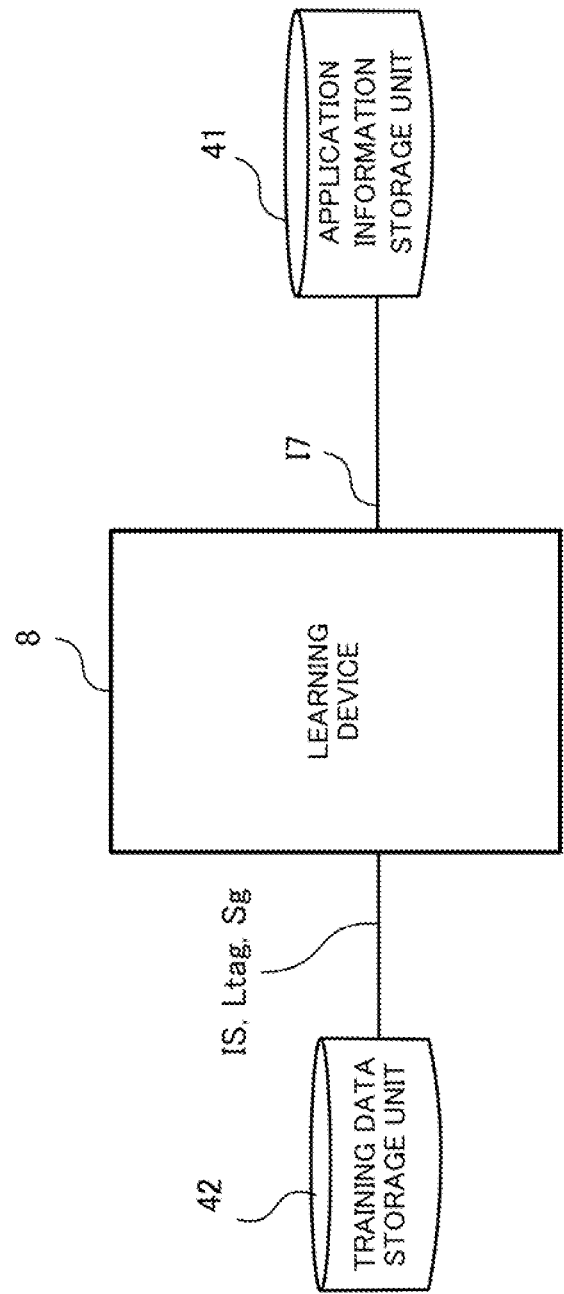
FIG. 6 illustrates a schematic configuration of a learning device according to the first example embodiment.

FIG. 6 shows a schematic configuration of a learning device 8 configured to generate parameters of a subgoal inference engine that are stored as the subgoal inference information 17 in the application information storage unit 41.

The learning device 8 is a device capable of referring to the application information storage unit 41 and the training data storage unit 42, and includes a processor, a memory, an interface, and the like in the same way as the configuration of the control device 1 illustrated in FIG. 2. The learning device 8 may be a control device 1, or may be any other device (e.g., a simulator) such as a personal computer other than the control device 1. In the preparation stage (e.g., a stage before the practical use of the robot control system 100) in which the control device 1 generates the operation sequence to be executed by the robot 5, the learning device 8 performs learning (training) for generating the parameters of the subgoal inference engine to be stored in the application information storage unit 41 as the subgoal inference information 17 with reference to the training data storage unit 42.

The training data storage unit 42 stores training data to be used for the supervised learning of the subgoal inference engine. The training data storage unit 42 stores plural sets of: the abstract state setting information IS indicating abstract states in a workspace; a final goal logical formula Ltag indicating a final goal; and one or more subgoals suitable for the combination of the abstract states and the final goal. The training data stored in the training data storage unit 42 may be data generated based on past results actually planned by the control device 1 that is a real machine, or may include pseudo-generated data based on a technique such as Domain Randomization, an experimental design method, and reinforcement learning.

The learning device 8 trains a learning model as the subgoal inference engine through supervised learning in which the abstract states and the final goal logical formula Ltag are used as input samples and the subgoal Sg is used as correct answer data, wherein the abstract states, the final goal logical formula Ltag, and the subgoal Sg are the training data acquired from the training data storage unit 42. In this case, for example, the learning device 8 determines the parameters of the subgoal inference engine such that the error (loss) between the inference result outputted by the subgoal inference engine and the above-described correct answer data is minimized when the above-described input sample is inputted to the subgoal inference engine.

The algorithm for determining the parameters described above to minimize loss may be any learning algorithm used in machine learning, such as a gradient descent method or an error back-propagation method. Then, the learning device 8 stores the parameters of the subgoal inference engine after the training as the subgoal inference information 17 in the application information storage unit 41. It is noted that the subgoal inference engine may be learned for each type of the objective task. In this case, the training data stored in the training data storage unit 42 includes information on the type of the objective task, and the subgoal inference information 17 stores the parameters of the subgoal inference engine for each type of the objective task.

Thus, the learning device 8 generates the subgoal inference information 17 by learning the parameters of the subgoal inference engine in advance based on the training data stored in the training data storage unit 42. Thus, the subgoal setting unit 17 configures the subgoal inference engine with reference to the generated subgoal inference information 17 thereby to accurately determine the subgoal Sg to be set.

(8) Details of Operation Sequence Generation Unit

Next, detailed process executed by the operation sequence generation unit 18 will be described.

(8-1) Functional Block

Figure 7:
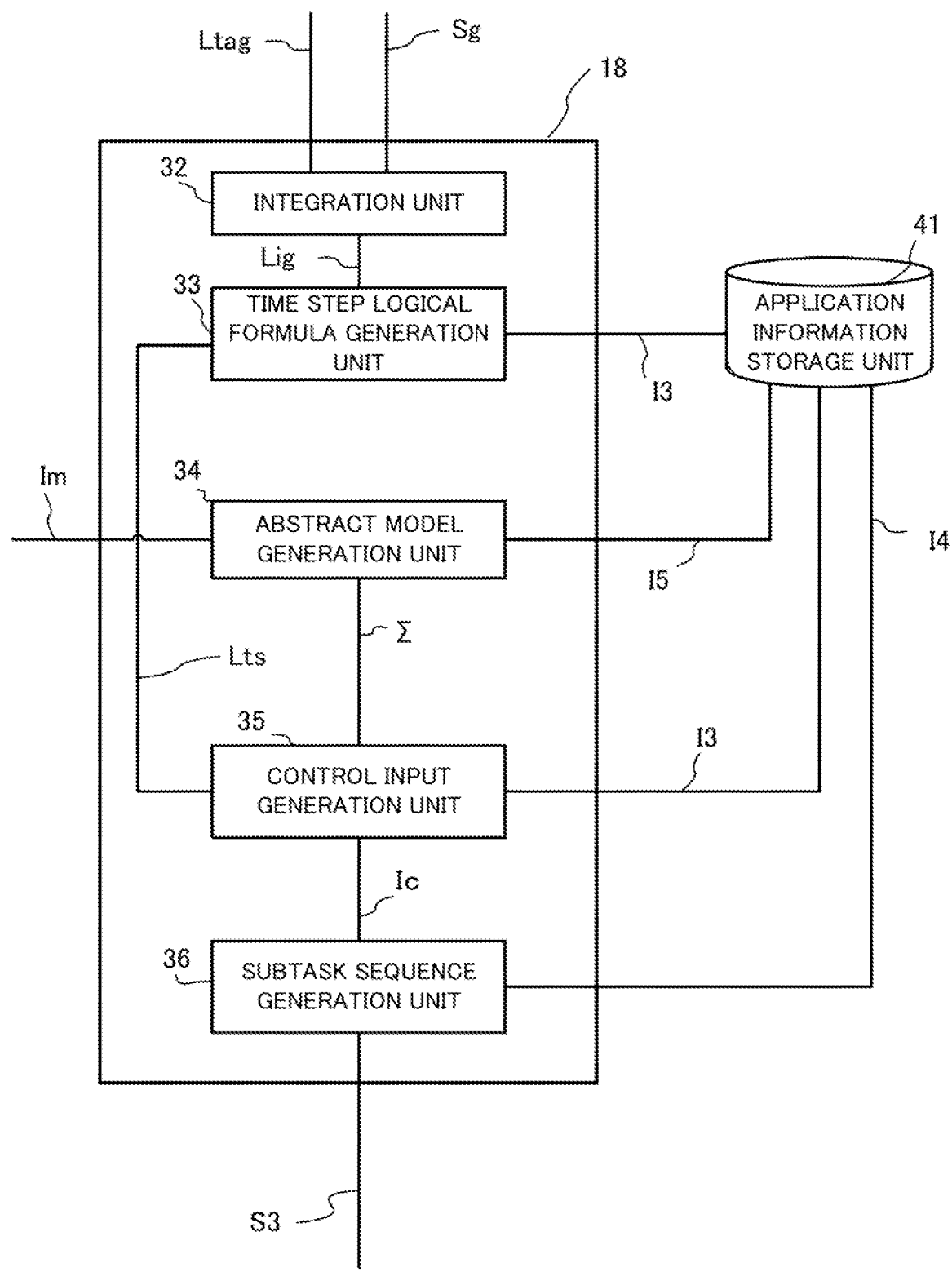
FIG. 7 is an example of a functional block showing the functional configuration of the operation sequence generation unit in the first example embodiment.

FIG. 7 is an example of a functional block showing the functional configuration of the operation sequence generation unit 18. The operation sequence generation unit 18 functionally includes an integration unit 32, a time step logic expression generation unit 33, an abstract model generation unit 34, a control input generation unit 35, and a subtask sequence generation unit 36.

The integration unit 32 generates the integrated logical formula "Lig" obtained by integrating the subgoal Sg supplied from the subgoal setting unit 17 into the final goal logical formula Ltag supplied from the final goal setting unit 16. A specific example of the process executed by the integration unit 32 will be described later in the section "(8-2) Integration Unit".

The time step logical formula generation unit 33 converts the integrated logical formula Lig supplied from the integration unit 32 into a logical formula (also referred to as "time step logical formula Lts") representing the state at each time step. Then, the time step logical formula generation unit 33 supplies the generated time step logical formula Lts to the control input generation unit 35.

The abstract model generation unit 34 generates an abstract model "Σ" in which the real dynamics in the workspace 6 is abstracted based on the state information Im supplied from the abstract state setting unit 15 and the abstract model information 15 stored in the application information storage unit 41. In this case, the abstract model generation unit 34 considers the target dynamics as a hybrid system in which the continuous dynamics and the discrete dynamics are mixed, and generates the abstract model E based on the hybrid system. The method for generating the abstract model E will be described later. The abstract model generation unit 34 supplies the generated abstract model E to the control input generation unit 35.

The control input generation unit 37 determines a control input to the robot 5 for each time step so that the time step logical formula Lts supplied from the time step logical formula generation unit 33 and the abstract model E supplied from the abstract model generation unit 34 are satisfied and so that the evaluation function is optimized. The evaluation function is designed, for example, to minimize the energy spent by the robot 5. Then, the control input generation unit 35 supplies information (also referred to as "control input information Ic") indicating the control input to the robot 5 for each time step to the subtask sequence generation unit 36.

The subtask sequence generation unit 36 generates a subtask sequence based on the control input information Ic supplied from the control input generation unit 35 and the subtask information 14 stored in the application information storage unit 41, and supplies the control signal S3 indicating the subtask sequence to the robot 5.

(8-2) Integration Unit and Time Step Logical Formula Generation Unit

The integration unit 32 generates the integrated logical formula Lig by integrating the subgoal Sg supplied from the subgoal setting unit 17 into the final goal logical formula Ltag supplied from the final goal setting unit 16. In this case, the integration unit 32 generates the integrated logical formula Lig that is the combination, by logical AND, of the final goal logical formula Ltag and the subgoal Sg that is a logical formula.

The time step logical formula generation unit 33 determines the number of time steps (also referred to as the "target time step number") for completing the objective task, and determines combinations of propositions representing the state at each time step such that the integrated logical formula Lig is satisfied with the target time step number. Since the combinations are normally plural, the time step logical formula generation unit 33 generates a logical formula obtained by combining these combinations by logical OR as the time step logical formula Lts. Each of the combinations described above is a candidate of a logical formula representing a sequence of operations to be instructed to the robot 5, and therefore it is hereinafter also referred to as "candidate p".

Here, a description will be given of a specific example of the processing executed by the integration unit 32 and the time step logical formula generation unit 33 when the objective task "the target object (i=2) eventually exists in the area G" is set according to the description relating to FIG. 5. Hereafter, the proposition "$g_i$, k", that is the proposition "$g_i$" extended to include the notion of time steps, is used. Here, the proposition "$g_i$, k" is the proposition indicating "the target object i exists in the area G at time step k".

Here, when the target time step number is "3", the final goal setting unit 16 supplies the integration unit 32 with the logical formula shown below as the final goal logical formula Ltag.

$$(\Diamond g_{2,3}) \wedge (\wedge_{k=1,2,3} \Box \neg h_k) \wedge (\wedge_{i,k=1,2,3} \Box \neg o_i)$$

Further, the subgoal setting unit 17 sets the subgoal Sg corresponding to "the target object (i=2) exists in the area G after two steps", and supplies a logical formula "$g_2$, 2" representing the subgoal Sg to the integrated unit 32.

In this case, the integration unit 32 combines the subgoal Sg with the final goal logical formula Ltag by logical AND to generate the following integrated logical formula Lig.

$$(\Diamond g_{2,3}) \wedge g_{2,2} \wedge (\wedge_{k=1,2,3} \Box \neg h_k) \wedge ((\wedge_{i,k=1,2,3} \Box \neg o_i)$$

Here, "$\Diamond g_{2,3}$" corresponding to the objective task can be rewritten as shown in the following equation.

$$\Diamond g_{2,3} = (\neg g_{2,1} \wedge \neg g_{2,2} \wedge g_{2,3}) \vee (\neg g_{2,1} \wedge g_{2,2} \wedge g_{2,3}) \vee (g_{2,1} \wedge \neg g_{2,2} \wedge g_{2,3}) \vee (g_{2,1} \wedge g_{2,2} \wedge g_{2,3})$$

The final goal logical formula Ltag into which the subgoal Sg is not integrated is represented by a logical OR ($\varphi_1 \vee \varphi_2 \vee \varphi_3 \vee \varphi_4$) of four candidates "$\varphi_1$" to "$\varphi_4$" as shown in below.

$$\phi_1 = (\neg g_{2,1} \wedge \neg g_{2,2} \wedge g_{2,3}) \wedge (\wedge_{k=1,2,3} \Box \neg h_k) \wedge (\wedge_{i,k=1,2,3} \Box \neg o_{i,k})$$

$$\phi_2 = (\neg g_{2,1} \wedge g_{2,2} \wedge g_{2,3}) \wedge (\wedge_{k=1,2,3} \Box \neg h_k) \wedge (\wedge_{i,k=1,2,3} \Box \neg o_{i,k})$$

$$\phi_3 = (g_{2,1} \wedge \neg g_{2,2} \wedge g_{2,3}) \wedge (\wedge_{k=1,2,3} \Box \neg h_k) \wedge (\wedge_{i,k=1,2,3} \Box \neg o_{i,k})$$

$$\phi_4 = (g_{2,1} \wedge g_{2,2} \wedge g_{2,3}) \wedge (\wedge_{k=1,2,3} \Box \neg h_k) \wedge (\wedge_{i,k=1,2,3} \Box \neg_{i,k})$$

On the other hand, "$(\Diamond g_{2,3}) \wedge g_{2,2}$" obtained by adding the subgoal Sg to "$\Diamond g_{2,3}$" can be rewritten as shown in the following equation.

$$\Diamond g_{2,3} \wedge g_{2,2} = (\neg g_{2,1} \wedge g_{2,2} \wedge g_{2,3}) \vee (g_{2,1} \wedge g_{2,2} \wedge g_{2,3})$$

Therefore, the integrated logical formula Lig in which the final goal logical formula Ltag and the subgoal Sg are integrated is represented by logical OR ($\varphi_2 \vee \varphi_4$) of the candidate $\varphi_2$ and the candidate $\varphi_4$ described above. Therefore, the time-step logical formula generation unit 33 defines the logical sum ($\varphi_2 \vee \varphi_4$) as the time step logical formula Lts. In this situation, the time step logical formula Lts is true if at least one of the two candidates $\varphi_2$ or $\varphi_4$ is true.

Thus, by integrating the subgoal Sg to the final goal logical formula Ltag, the integration unit 32 can suitably reduce the number of candidates (p each of which is a candidate of the logical formula representing the operation sequence to be instructed to the robot 5. Thus, it is possible to suitably reduce the calculation amount in the optimization process to be executed by the control input generation unit 35.

Next, a supplementary description will be given of a method for setting the target time step number.

For example, the time step logical formula generation unit 33 determines the target time step number based on the prospective (expected) work time designated by the user input. In this case, the time step logical formula generation unit 33 calculates the target time step number based on the prospective work time described above and the information on the time width per time step stored in the memory 12 or the storage device 4. In another example, the time step logical formula generation unit 33 stores, in advance in the memory 12 or the storage device 4, information in which a suitable target time step number is associated with each type of objective task, and determines the target time step number in accordance with the type of objective task to be executed by referring to the information.

In some embodiments, the time step logical formula generation unit 33 sets the target time step number to a predetermined initial value. Then, the time step logical formula generation unit 33 gradually increases the target time step number until the time step logical formula Lts with which the control input generation unit 35 can determine the control input is generated. In this case, if the control input generation unit 35 ends up not being able to derive the optimal solution in the optimization process with the set target time step number, the time step logical formula generation unit 33 adds a predetermined number (1 or more integers) to the target time step number.

At this time, the time step logical formula generation unit 33 may set the initial value of the target time step number to a value smaller than the number of time steps corresponding to the work time of the objective task expected by the user. Thus, the time step logical formula generation unit 33 suitably suppresses setting the unnecessarily large target time step number.

(8-3) Abstract Model Generation Unit

The abstract model generation unit 34 generates the abstract model $\Sigma$ based on the abstract model information 15 and the state information Im. Here, the information necessary for generating the abstract model $\Sigma$ is recorded in the abstract model information 15 for each type of the objective task. For example, when the objective task is pick-and-place, an abstract model in a general format that does not specify the position or number of the target objects, the position of the area where the object is placed, the number of robots 5 (or the number of robot arms 52), and the like is recorded in the abstract model information 15. Then, the abstract model generation unit 34 generates the abstract model $\Sigma$ by reflecting the state information Im in the abstract model in the general format including the dynamics of the robot 5 recorded in the abstract model information 15. Thus, the abstract model $\Sigma$ becomes a model in which the state of objects present in the workspace 6 and the dynamics of the robot 5 are abstractly represented. The state of the objects present in the workspace 6 indicates the position and number of the target objects, the position of the area where the target object is placed, the number of robots 5 and the like in the case of pick-and-place.

Here, at the time of work of the objective task by the robot 5, the dynamics in the workspace 6 is frequently switched. For example, in the case of pick-and-place, while the robot arm 52 is gripping the target object i, the target object i can be moved. However, if the robot arm 52 is not gripping the target object i, the target object i cannot be moved.

In view of the above, in the present example embodiment, in the case of pick-and-place, the operation of grasping the target object i is abstracted by the logical variable "$\delta_i$". In this case, for example, the abstract model generation unit 34 can define the abstract model $\Sigma$ to be set for the workspace 6 shown in FIG. 7 as the following equation (1).

$$\begin{bmatrix} x_{r1} \\ x_{r2} \\ x_1 \\ \vdots \\ x_4 \end{bmatrix}_{k+1} = I \begin{bmatrix} x_{r1} \\ x_{r2} \\ x_1 \\ \vdots \\ x_4 \end{bmatrix}_k + \begin{bmatrix} I & 0 \\ 0 & I \\ \delta_{1,1}I & \delta_{2,1}I \\ \vdots & \vdots \\ \delta_{1,4}I & \delta_{2,4}I \end{bmatrix} \begin{bmatrix} u_1 \\ u_2 \end{bmatrix} \quad (1)$$

$$h_{ij_{min}}(1 - \delta_i) \leq h_{ij}(x) \leq h_{ij_{max}} \delta_i + (\delta_i - 1)\varepsilon$$

Here, "$u_j$" indicates a control input for controlling the robot hand j ("j=1" is the robot hand 53a, "j=2" is the robot hand 53b), and "I" indicates a unit matrix. "0" indicates a zero matrix. It is herein assumed that the control input is a speed as an example, but it may be an acceleration. Further, "$\delta_{j,i}$" is a logical variable that is set to "1" when the robot hand j grasps the target object i and is set to "0" in other cases. Each of "$x_{r1}$" and "$x_{r2}$" indicates the position vector of the robot hand j (j=1, 2), and each of "$x_1$" to "$x_4$" indicates the position vector of the target object i. Further, "h (x)" is a variable to be "h (x)>=0" when the robot hand exists in the vicinity of the target object to the extent that it can grasp the target object, and satisfies the following relationship with the logical variable $\delta$.

$$\delta=1 \Leftrightarrow h(x) \geq 0$$

In this equation, the logical variable $\delta$ is set to 1, on the assumption that the robot hand grasps the target object if the robot hand exists in the vicinity of the target object to the extent that it can grasp the target object.

Here, the equation (1) is a difference equation showing the relationship between the states of the objects at the time step k and the states of the objects at the time step (k+1). Then, in the above equation (1), since the state of the grasp is represented by a logic variable that is a discrete value, and the movement of the target objects is represented by a continuous value, the equation (1) shows a hybrid system.

The equation (1) considers not the detailed dynamics of the entire robot 5 but only the dynamics of the robot hands of the robot 5 that actually grasp the target object. Thus, it is possible to suitably reduce the calculation amount of the optimization process by the control input generation unit 35.

Further, the abstract model information 15 includes information for deriving the difference equation according to the equation (1) from the state information Im and information on the logical variable corresponding to the operation (the operation of grasping the target object i in the case of pick-and-place) causing the dynamics to switch. Thus, even when there is a variation in the position and the number of the target objects, the area (area G in FIG. 5) where the target objects are to be placed and the number of the robots 5 and the like, the abstract model generation unit 34 can determine the abstract model $\Sigma$ in accordance with the environment of the target workspace 6 based on the abstract model information 15 and the state information Im.

It is noted that, in place of the model shown in the equation (1), the abstract model generation unit 34 may generate any other hybrid system model such as mixed logical dynamical (MLD) system, Petri nets, automaton, and their combination.

(8-4) Control Input Generation Unit

The control input generation unit 35 determines the optimal control input for the robot 5 with respect to each time step based on: the time step logical formula Lts supplied from the time step logical formula generation unit 33; the abstract model $\Sigma$ supplied from the abstract model generation unit 34; and an evaluation function. In this case, the control input generation unit 35 solves the optimization problem of minimizing the evaluation function with the abstract model $\Sigma$ and the time step logical formula Lts which function as constraint conditions. For example, the evaluation function is predetermined for each type of the objective task and stored in the memory 12 or the storage device 4.

For example, when the objective task is pick-and-place, the control input generation unit 35 determines the evaluation function so that the control input "$u_k$" and the distance "$d_k$" between the target object to be carried and the goal point to place the target object are minimized (i.e., the energy spent by the robot 5 is minimized). The distance $d_k$ described above corresponds to the distance at the time step k between the target object (i=2) and the area G when the objective task is "the target object (i=2) is eventually present in the area G".

For example, the control input generation unit 35 determines the evaluation function to be the sum of the square of the distance $d_k$ and the square of the control input $u_k$ in all time steps, and solves the constrained mixed integer optimization problem shown in the following equation (2) with the abstract model $\Sigma$ and the time-step logical formula Lts (that is, the logical OR of the candidates $\varphi_i$) which function as the constraint conditions.

$$\min_u \left( \sum_{k=0}^{T} (\|d_k\|_2^2 + \|u_k\|_2^2) \right) \quad (2)$$
$$\text{s.t.} \sum \bigvee \phi_i$$

Here, "T" is the number of time steps to be considered in the optimization and it may be a target time step number or may be a predetermined number smaller than the target time step number as described later. In some embodiments, the control input generation unit 35 approximates the logic variable by a continuous value (i.e., solve a continuous relaxation problem). Thereby, the control input generation unit 35 can suitably reduce the calculation amount. When STL is adopted instead of linear temporal logic (LTL), it can be described as a nonlinear optimization problem.

Further, if the target time step number is long (e.g., larger than a predetermined threshold value), the control input generation unit 35 may set the time step number to be used for optimization to a value (e.g., the threshold value described above) smaller than the target time step number. In this case, the control input generation unit 35 sequentially determines the control input $u_k$ by solving the optimization problem based on the equation (2), for example, every time a predetermined number of time steps elapses.

In some embodiments, the control input generation unit 35 may solve the optimization problem based on the expression (2) for each subgoal Sg which is an intermediate state for the achievement state of the objective task and determine the control input $u_k$ to be used. In this case, the control input generation unit 35 sets the number of time steps up to the following subgoal Sg (or the achievement state of the objective task if all the subgoals Sg are achieved) to the time step number T in the equation (2). Thus, the control input generation unit 35 reduces the time step number T per one optimization process thereby to suitably reduce the computational complexity of the optimization.

(6-7) Subtask Sequence Generation Unit

The subtask sequence generation unit 36 generates a subtask sequence based on the control input information Ic supplied from the control input generation unit 35 and the subtask information 14 stored in the application information storage unit 41. In this case, by referring to the subtask information 14, the subtask sequence generation unit 36 recognizes subtasks that the robot 5 can accept and converts the control input for each time step indicated by the control input information Ic into subtasks.

For example, in the subtask information 14, there are defined functions representing two subtasks, the movement (reaching) of the robot hand and the grasping by the robot hand, as subtasks that can be accepted by the robot 5 when the objective task is pick-and-place. In this case, for example, the function "Move" representing the reaching is a function that uses the following three arguments (parameters): the initial state of the robot 5 before the function is executed; the final state of the robot 5 after the function is executed; and the time to be required for executing the function. In addition, for example, the function "Grasp" representing the grasping is a function that uses the following these arguments: the state of the robot 5 before the function is executed; the state of the target object to be grasped before the function is executed; and the logical variable δ. Here, the function "Grasp" indicates performing a grasping operation when the logical variable δ is "1", and indicates performing a releasing operation when the logic variable δ is "0". In this case, the subtask sequence generation unit 36 determines the function "Move" based on the trajectory of the robot hand determined by the control input for each time step indicated by the control input information Ic, and determines the function "Grasp" based on the transition of the logical variable δ for each time step indicated by the control input information Ic.

Then, the subtask sequence generation unit 36 generates a subtask sequence configured by the function "Move" and the function "Grasp", and supplies the control signal S3 indicative of the subtask sequence to the robot 5. For example, if the objective task is "the target object (i=2) is finally present in the area G", the subtask sequence generation unit 36 generates the subtask sequence Sr of the function "Move", the function "Grasp", the function "Move", and the function "Grasp" for the robot hand closest to the target object (i=2). In this case, the robot hand closest to the target object (i=2) moves to the position of the target object (i=2) by the function "Move", grasps the target object (i=2) by the function "Grasp", moves to the area G by the function "Move", and places the target object (i=2) in the area G by the function "Grasp".

(9) Process Flow

Figure 8:
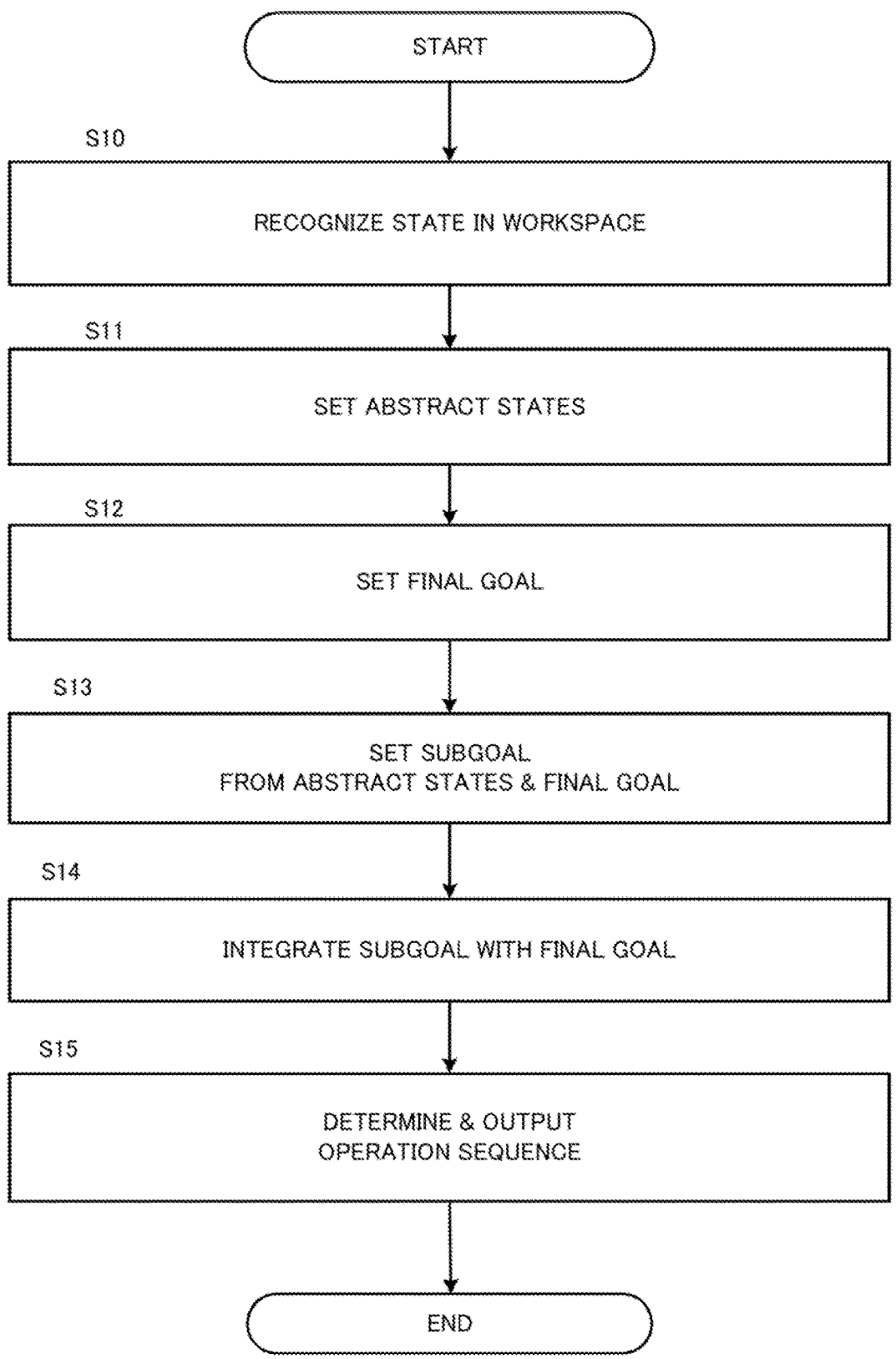
FIG. 8 is an example of a flowchart showing an outline of the robot control process performed by the control device in the first example embodiment.

FIG. 8 is an example of a flowchart showing an outline of the robot control process performed by the control device 1 in the first example embodiment.

First, the abstract state setting unit 15 of the control device 1 recognizes the state in the workspace 6 based on the detection signal S4 supplied from the detection device 7 via the interface 13 and the object model information 16, and generates the state information Im (step S10). Further, the abstract state setting unit 15 sets abstract states in the workspace 6 based on the state information Im and the abstract state designation information I1, and generates abstract state setting information IS indicating the set abstract states (step S11).

Then, the final goal setting unit 16 sets the final goal logical formula Ltag indicating the final goal based on the objective task specified by the input signal S1 or the like (step S12). In this case, by referring to the constraint condition information 12, the final goal setting unit 16 adds the constraint conditions in executing the objective task to the final goal logical formula Ltag. The process at step S12 may be executed before the process at step S11.

Next, the subgoal setting unit 17 sets the subgoal Sg based on the abstract states set at step S11 and the final goal logical formula Ltag indicating the final goal set at step S12 (step S13). In this case, the subgoal setting unit 17 inputs the above-described abstract states and the final goal logical formula Ltag to the subgoal inference engine configured by referring to the subgoal inference information 17, and sets the subgoal Sg based on the inference result thereof.

Next, the operation sequence generation unit 18 integrates the final goal logical formula Ltag indicative of the final goal with the subgoal Sg (step S14). Thereby, the operation sequence generation unit 18 generates the integrated logical formula Lig. Then, the operation sequence generation unit 18 determines a subtask sequence that is an operation sequence to be executed by the robot 5 by performing an optimization process or the like based on the integrated logical formula Lig, the state information Im, and the application information (step S15). Then, the operation sequence generation unit 18 outputs a control signal S3 indicating the subtask sequence to the robot 5 through the interface 13.

(10) Modification

The subgoal setting unit 17 may determine the subgoal Sg by performing template matching using the subgoal inference information 17 instead of determining the subgoal Sg based on the learned subgoal inference engine.

In this case, the subgoal inference information 17 is a table (or database) configured by records each of which associates each possible combination of the abstract states and the final goal logical formula Ltag with the subgoal Sg to be set for the each possible combination. When the objective task is designated, the subgoal setting unit 17 searches the table for a record that matches the abstract states indicated by the abstract state setting information IS generated by the abstract state setting unit 15 and the final goal logical formula Ltag generated by the final goal setting unit 16. Then, the subgoal setting unit 17 recognizes the subgoal Sg described in the searched record as the subgoal Sg to be set.

A supplemental description will be given of such a case where there is no record that exactly matches the abstract states indicated by the abstract state setting information IS generated by the abstract state setting unit 15 and the final goal logical formula Ltag generated by the final goal setting unit 16. In this case, the subgoal setting unit 17 recognizes the subgoal of the record corresponding to the abstract state and the final goal logical formula Ltag most similar to the combination of the target abstract state and the final goal logical formula Ltag as the subgoal Sg to be set. For example, the subgoal setting unit 17 calculates an arbitrary degree of similarity (including a distance in the feature space) between each record and the combination of the target abstract states and the final goal logical formula Ltag, and recognizes the subgoal indicated by the record having the highest degree of similarity as the subgoal Sg to be set.

Accordingly, the subgoal setting unit 17 may determine the subgoal Sg based on the subgoal inference information 17 generated without learning.

Second Example Embodiment

Figure 9:
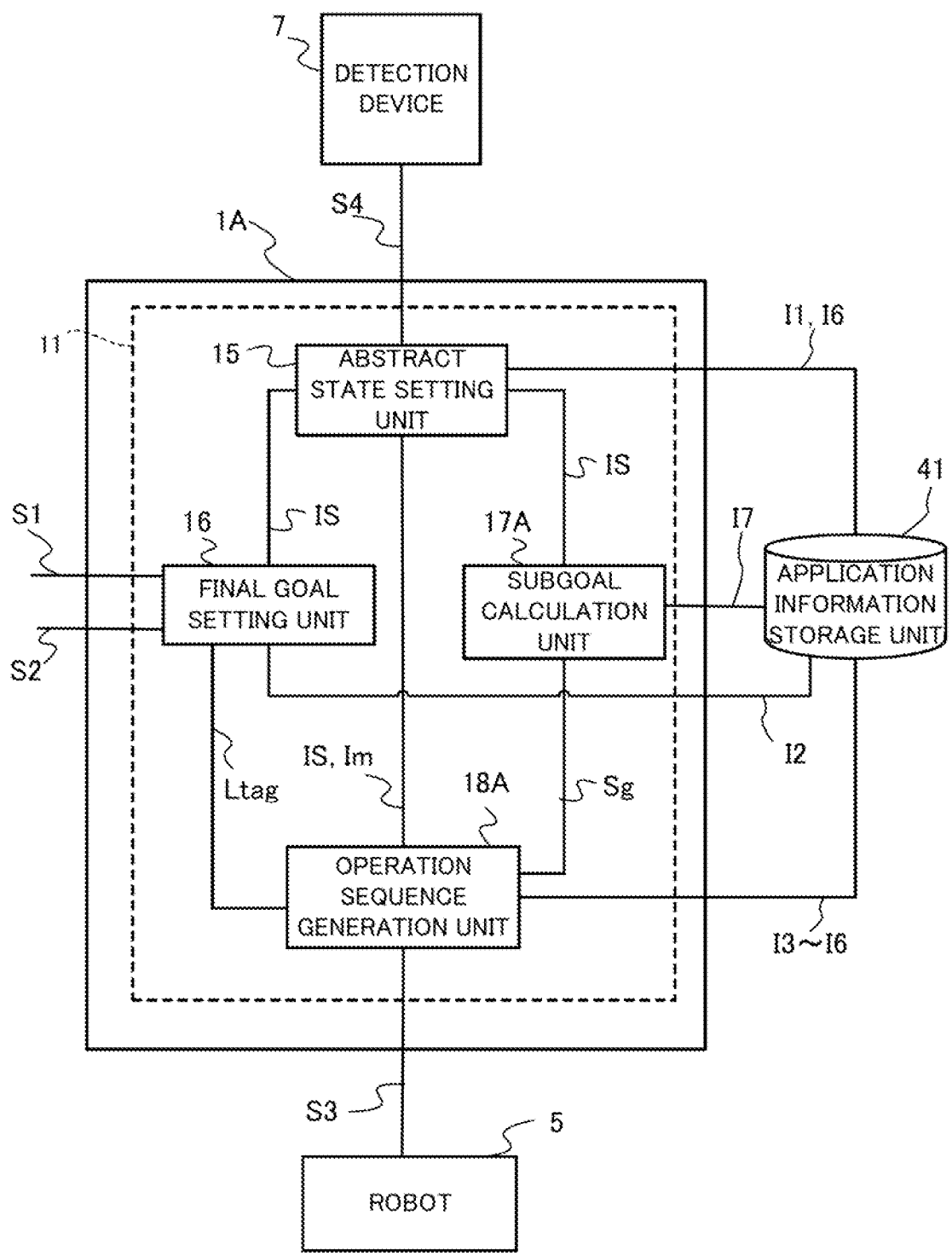
FIG. 9 is a schematic configuration diagram of a control device in the second example embodiment.

FIG. 9 is a schematic configuration diagram of a control device 1A in the second example embodiment. The control device 1A according to the second example embodiment differs from the control device 1 according to the first example embodiment in that the subgoal Sg is generated without being based on the final goal logical formula Ltag and that the subgoal Sg is defined as a constraint condition in the optimization. Hereinafter, the same components in the second example embodiment as in the first example embodiment are appropriately denoted by the same reference numerals, and description thereof will be omitted.

The control device 1A has a hardware configuration shown in FIG. 2 described in the first example embodiment. Then, as shown in FIG. 9, the processor 11 of the control device 1A functionally includes an abstract state setting unit 15, a final goal setting unit 16, a subgoal setting unit 17A, and an operation sequence generation unit 18A. The abstract state setting unit 15 generates the state information Im and the abstract state setting information IS by performing the same process as the process executed by the abstract state setting unit 15 according to the first example embodiment. Further, the final goal setting unit 16 generates the final goal logical formula Ltag by performing the same process as the process executed by the final goal setting unit 16 according to the first example embodiment.

The subgoal setting unit 17A sets the subgoal Sg based on the abstract state setting information IS supplied from the abstract state setting section 15 and the subgoal inference information 17. In this case, the subgoal inference information 17 contains the information on the parameters of a subgoal inference engine. The subgoal inference engine is learned to output, when abstract states that are abstracted states in the workspace 6 are inputted, one or more subgoals Sg which are constraint conditions for the robot 5 in the abstract states. The subgoal setting unit 17A configures the subgoal inference engine by referring to the subgoal inference information 17, and acquires the subgoal Sg to be set from the inference result outputted by the subgoal inference engine by inputting the abstract states indicated by the abstract state setting information IS into the subgoal inference engine.

It is noted that the subgoal Sg according to the first example embodiment is an intermediate goal (i.e., a subgoal depending on the final goal) for achieving the final goal, whereas the subgoal Sg according to the second example embodiment is a more general constraint (rule) independent of the final goal. For example, the subgoal Sg according to the second example embodiment may indicate the movable range of the robot 5, or may indicate a constraint condition that, if a door is present in the workspace 6, the robot 5 cannot pass through the door unless performing the operation of opening the door. The subgoal Sg according to the second example embodiment may depend on the type of the objective task. In this case, the subgoal Sg according to the second example embodiment may be a constraint condition determined based on the type of the objective task and the abstract states in the given workspace 6.

The operation sequence generation unit 18A generates a subtask sequence to be executed by the robot 5 based on the final goal logical formula Ltag, the state information Im, the abstract state setting information IS, the subgoal Sg, and the application information. In this case, the operation sequence generation unit 18 determines the subtask sequence by performing optimization of the evaluation function using the subgoal Sg supplied from the subgoal setting unit 17 as a constraint condition.

Figure 10:
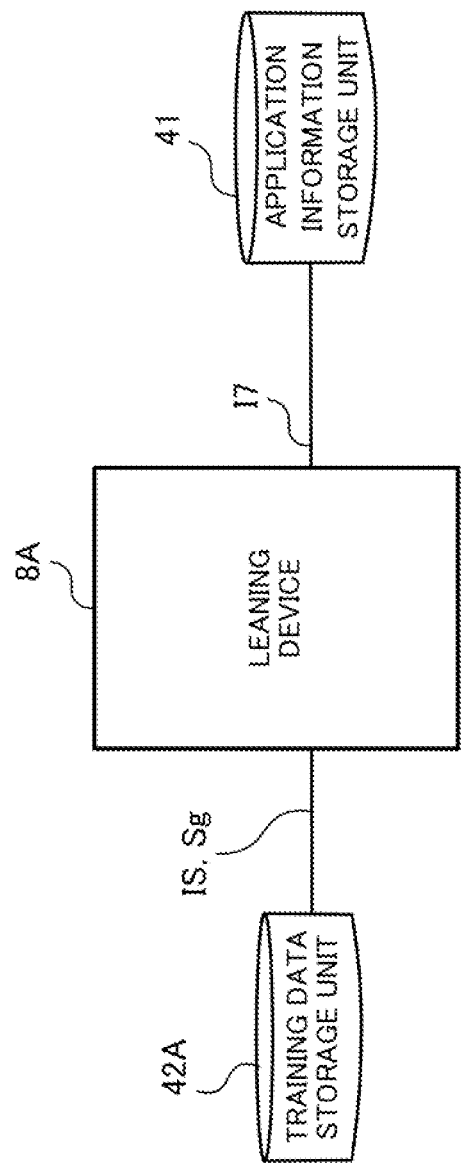
FIG. 10 illustrates the schematic configuration of a learning device according to the second example embodiment.

FIG. 10 shows a schematic configuration of a learning device 8A in the second example embodiment configured to generate the parameters of a subgoal inference engine to be stored as the subgoal inference information 17 in the application information storage unit 41. The learning device 8A, like the learning device 8 according to the first example embodiment, is a device that can refer to the application information storage unit 41 and the training data storage unit 42A, and includes one or more processors, a memory, an interface, and the like. The training data storage unit 42A stores, as training data, plural sets of the combination of the abstract state setting information IS indicating the abstract state in the workspace 6 and one or more subgoals Sg that are constraint conditions for the robot 5 in the abstract state. The learning device 8A generates the subgoal inference information 17 by training a learning model as the subgoal inference engine through supervised learning in which the abstract states are used as an input sample and the subgoal Sg is used as the correct answer data, wherein the above-mentioned abstract states and subgoal Sg are included in the training data acquired from the training data storage unit 42A. It is noted that the subgoal inference engine may be learned for each type of the objective task. In this case, the training data stored in the training data storage unit 42A includes information on the type of the objective task, and the subgoal inference information 17 stores the parameters of the subgoal inference engine for each type of the objective task.

Figure 11:
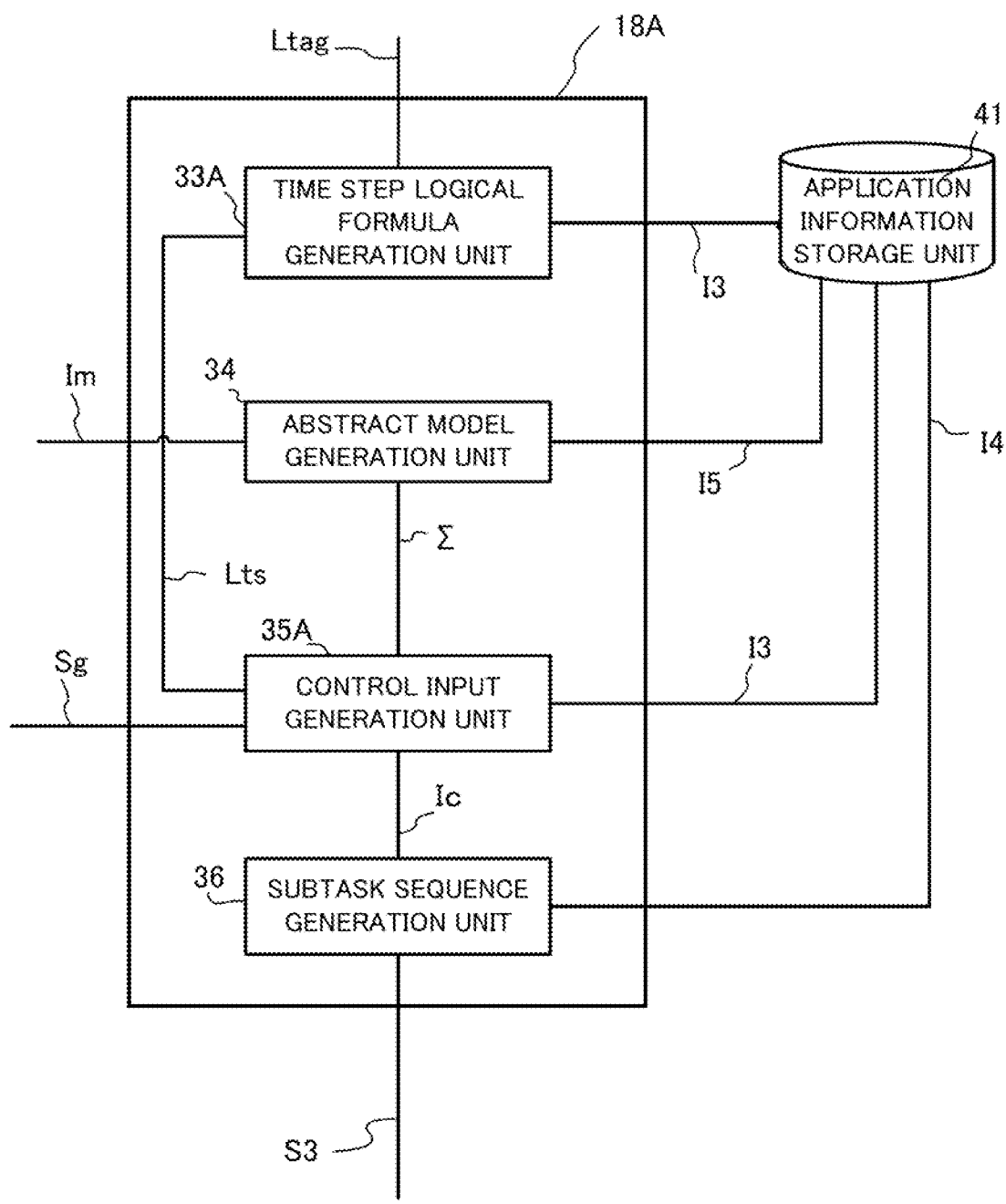
FIG. 11 is an example of a functional block of the operation sequence generation unit in the second example embodiment.

FIG. 11 is an example of a functional block of the operation sequence generation unit 18A according to the second example embodiment. The operation sequence generation unit 18A functionally includes a time step logical formula generation unit 33A, an abstract model generation unit 34, a control input generation unit 35A, and a subtask sequence generation unit 36. The time step logical formula generation unit 33A converts the final goal logical formula Ltag supplied from the final goal setting unit 16 into the time step logical formula Lts which is a logical formula representing the state at each time step. The abstract model generation unit 34 generates the abstract model Σ by performing the same process as the process executed by the abstract model generation unit 34 according to the first example embodiment.

The control input generation unit 35A determines the control input to the robot 5 for each time step so as to satisfy the time step logical formula Lts, the abstract model X, and the subgoal Sg, and to optimize the evaluation function. In this case, the control input generation unit 35 generates the control input information Ic by solving the optimization problem of minimizing the evaluation function using the abstract model E, the time step logical formula Lts, and the subgoal Sg as constraint conditions. For example, the evaluation function is the same as the evaluation function to be set in the first example embodiment. The subtask sequence generation unit 36 performs the same process as the process executed by the subtask sequence generation unit 36 according to the first example embodiment, and generates the subtask sequence based on the control input information Ic generated by the control input generation unit 35A and the subtask information 14.

Figure 12:
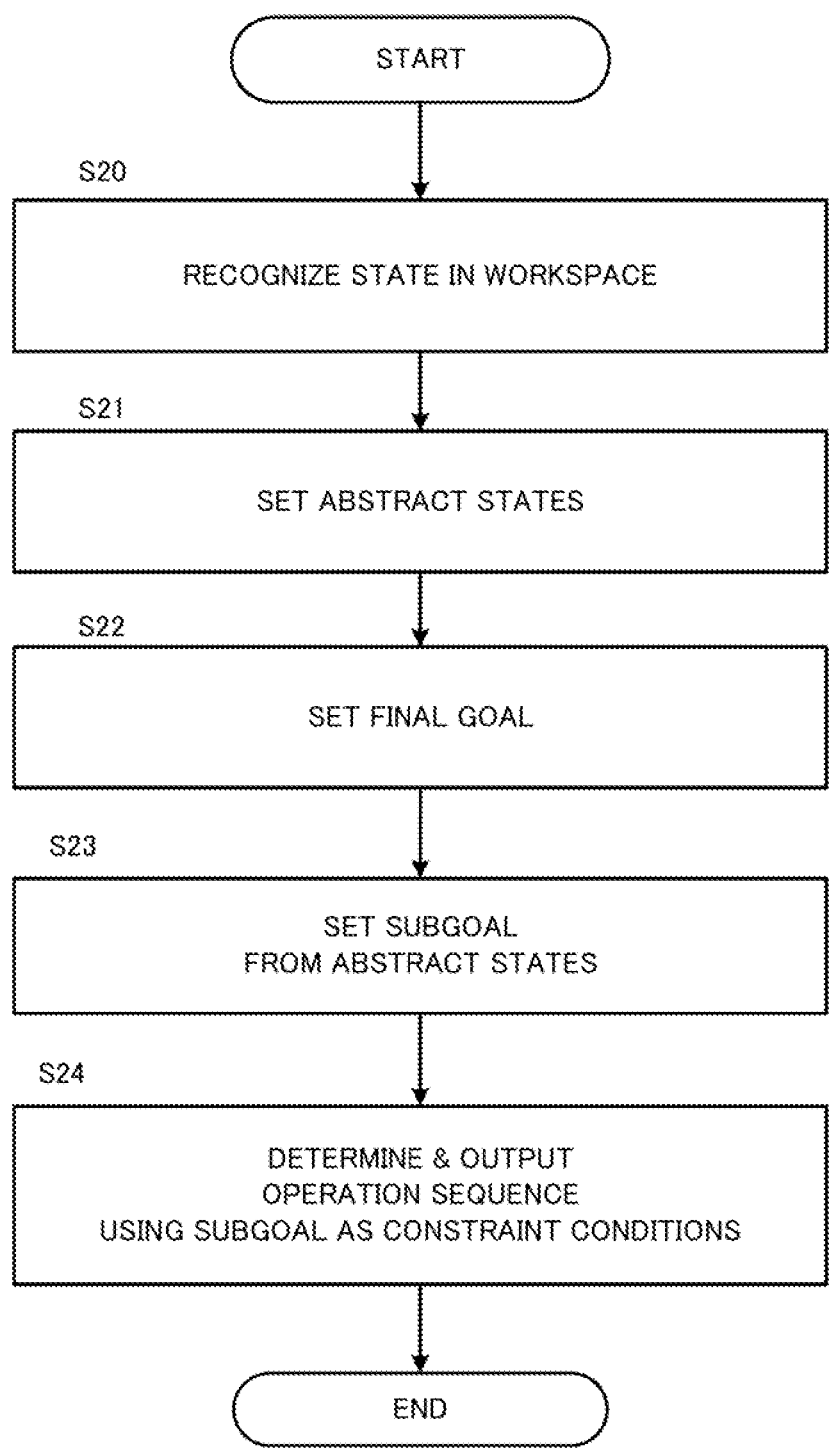
FIG. 12 is an example of a flowchart showing a processing procedure of the control device in the second example embodiment.

FIG. 12 is an example of a flowchart illustrating an outline of a robot control process executed by the control device 1A in the second example embodiment.

First, the abstract state setting unit 15 of the control device 1A recognizes the state in the workspace 6, based on the detection signal S4 supplied from the detection device 7 via the interface 13 and the object model information 16 to thereby generate the state information Im (step S20). Further, the abstract state setting unit 15 sets abstract states in the workspace 6 based on the state information Im and the abstract state designation information I1, and generates abstract state setting information IS indicating the set abstract states (step S21). Then, the final goal setting unit 16 sets the final goal logical formula Ltag from the objective task specified by the input signal S1 or the like (step S22). The processes at step S20 to step S22 are the same as the processes at step S10 to step S12 in FIG. 8.

Next, the subgoal setting unit 17A sets the subgoal Sg based on the abstract states set in step S21 (step S23). In this case, the subgoal setting unit 17A inputs the above-described abstract states to the subgoal inference engine configured by referring to the subgoal inference information 17, and sets the subgoal Sg based on the inference result thereof. As described in the section "(10) Modification" in the first example embodiment, the subgoal setting unit 17A may determine the subgoal Sg from the abstract state setting information IS based on the subgoal inference information 17 generated without learning process.

Next, the operation sequence generation unit 18A determines a subtask sequence that is an operation sequence to be executed by the robot 5 using the subgoal Sg set by the subgoal setting unit 17A as a constraint condition (step S24). Then, the operation sequence generation unit 18 outputs the control signal S3 indicating the subtask sequence to the robot 5 through the interface 13.

As described above, the control device 1A according to the second example embodiment generates a subtask sequence in consideration of constraints substantially required for the execution of the objective task through the optimization in which the subgoal Sg derived from the abstract state setting information IS is used as a part of constraint conditions. Thus, the control device 1A can cause the robot 5 to suitably perform the objective task.

Third Example Embodiment

Figure 13:
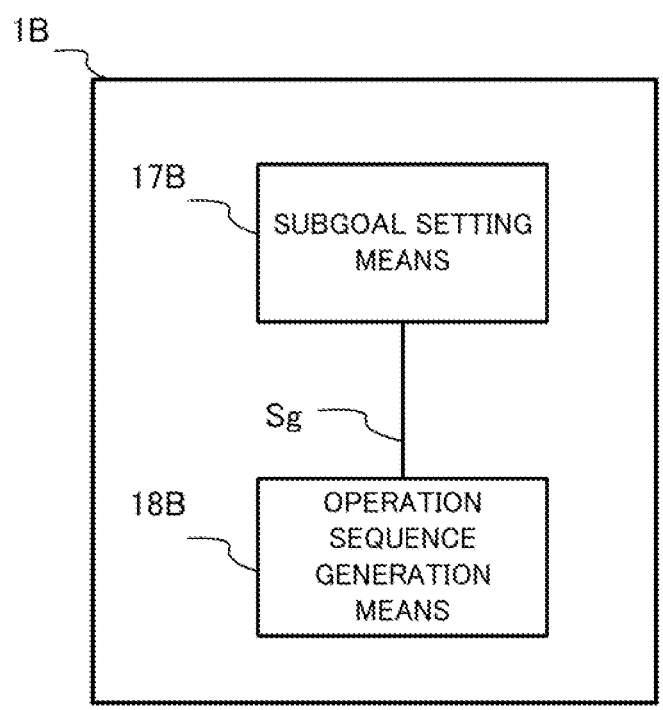
FIG. 13 is a schematic configuration diagram of a control device in the third example embodiment.

FIG. 13 is a schematic configuration diagram of a control device 1B in the third example embodiment. As shown in FIG. 13, the control device 1B mainly includes a subgoal setting means 17B and an operation sequence generation means 18B.

The subgoal setting means 17B is configured to set a subgoal "Sg" based on abstract states in which states in a workspace where a robot works are abstracted, the subgoal Sg indicating an intermediate goal for achieving a final goal or constraint conditions required to achieve the final goal. Here, the robot may be configured separately from the control device 1B, or may incorporate the control device 1B. Examples of the subgoal setting means 17B include the subgoal setting unit 17 in the first example embodiment and the subgoal setting unit 17A in the second example embodiment. In the latter case, the subgoal setting means 17B sets the subgoal Sg further based on the final goal in addition to the above-described abstract states. Examples of the final goal include the final goal logical formula Ltag in the first and second example embodiments.

The operation sequence generation means 18B is configured to generate an operation sequence to be executed by the robot based on the subgoal. Examples of the operation sequence generation means 18B include the operation sequence generation unit 18 in the first example embodiment or the operation sequence generation unit 18A in the second example embodiment.

Figure 14:
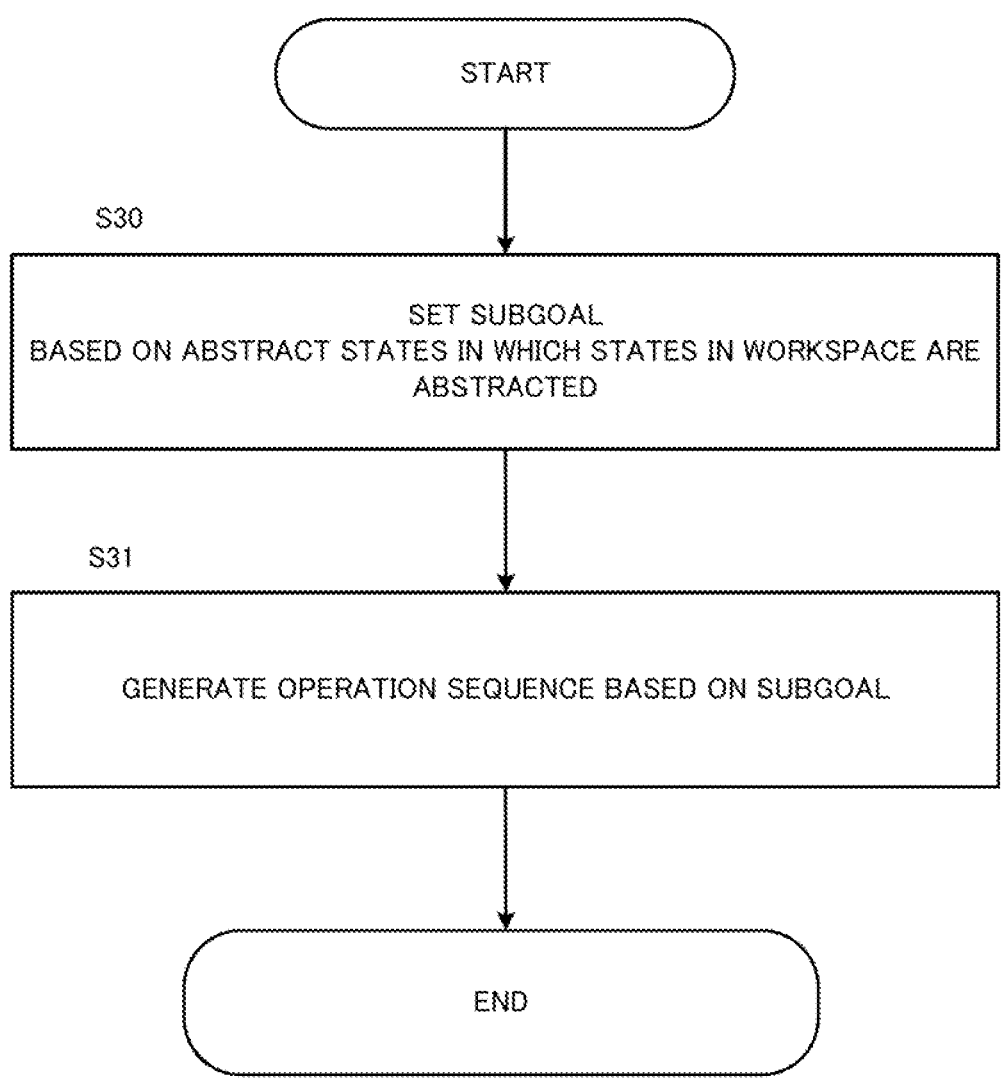
FIG. 14 is an example of a flowchart showing a processing procedure of the control device in the third example embodiment.

FIG. 14 is an example of flowchart executed by the control device 1B in the third example embodiment. The subgoal setting means 17B sets a subgoal "Sg" based on abstract states in which states in a workspace where a robot works are abstracted, the subgoal Sg indicating an intermediate goal for achieving a final goal or constraint conditions required to achieve the final goal (step S30). Then, the operation sequence generation means 18B generates an operation sequence to be executed by the robot based on the subgoal (step S31).

According to the configuration in the third example embodiment, the control device 1B may suitably generate an operation sequence so as to achieve a subgoal, and may suitably cause the robot to execute an objective task.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above can be described as, but not limited to, the following Supplementary Notes.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS

1, 1A, 1B Control device
2 Input device
3 Display device
4 Storage device
Robot
6 Workspace
7 Detection device
8, 8A Learning device
41 Application information storage unit
42, 42A Training data storage unit
100 Robot control system

What is claimed is:
1. A control device comprising:
at least one memory storing instructions; and
at least one processor configured to execute the instructions to:
set, based on an output signal from a detection device that is configured to detect a state in a workspace where a robot works, abstract states that are abstracted states in the workspace by defining a proposition for each abstract state, the proposition expressed in a logical formula in a form of a temporal logic;
convert, based on the abstract states, an objective task into a first logical formula, in the form of the temporal logic, representing a final goal to be achieved;
set a second logical formula, in the form of the temporal logic, representing a subgoal based on the abstract states and the first logical formula, the subgoal indicating an intermediate goal for achieving a final goal or constraint conditions required to achieve the final goal;

generate an integrated logical formula in the form of the temporal logic by combining the first logical formula and the second logical formula by logical AND; and generate an operation sequence to be executed by the robot based on the integrated logical formula, wherein the robot operates to execute the objective task under control of the control device, a robot control device of the robot performs operation control of each of a plurality of robotic arms of the robot based on a subtask sequence, and the first logical formula and the second logical formula are generated and then combined via logical AND to generate the integrated logical formula before the robot is controlled.

2. The control device according to claim 1,
wherein the at least one processor is configured to execute the instructions to:

generate, from the integrated logical formula, a time step logical formula, which is a logical formula representing states for each time step; and generate the operation sequence based on the time step logical formula.

3. The control device according to claim 1,
wherein the at least one processor is configured to execute the instructions to set the subgoal based on an inference engine, the inference engine being trained to output, when at least the abstract states and the final goal are inputted thereto, the subgoal in accordance with the inputted abstract states and the final goal.

4. The control device according to claim 1,
wherein the at least one processor is configured to execute the instructions to generate the operation sequence through optimization in which the subgoal is at least set to be a constraint condition.

5. The control device according to claim 4,
wherein the at least one processor is configured to execute the instructions to set the subgoal based on an inference engine, the inference engine being trained to output, when at least the abstract states are inputted thereto, the subgoal in accordance with the inputted abstract states.

6. A control method performed by a control device and comprising:

setting, based on an output signal from a detection device that is configured to detect a state in a workspace where a robot works, abstract states that are abstracted states in the workspace by defining a proposition for each abstract state, the proposition expressed in a logical formula in a form of a temporal logic;

converting, based on the abstract states, an objective task into a first logical formula, in the form of the temporal logic, representing a final goal to be achieved;

setting a second logical formula, in the form of the temporal logic, representing a subgoal based on the abstract states and the first logical formula, the subgoal indicating an intermediate goal for achieving a final goal or constraint conditions required to achieve the final goal;

generating an integrated logical formula in the form of the temporal logic by combining the first logical formula and the second logical formula by logical AND; and generating an operation sequence to be executed by the robot based on the integrated logical formula, wherein the robot operates to execute the objective task under control of the control device, a robot control device of the robot performs operation control of each of a plurality of robotic arms of the robot based on a subtask sequence, and the first logical formula and the second logical formula are generated and then combined via logical AND to generate the integrated logical formula before the robot is controlled.

7. A non-transitory computer readable storage medium storing a program executable by a control device to:

set, based on an output signal from a detection device that is configured to detect a state in a workspace where a robot works, abstract states that are abstracted states in the workspace by defining a proposition for each abstract state, the proposition expressed in a logical formula in a form of a temporal logic;

convert, based on the abstract states, an objective task into a first logical formula, in the form of the temporal logic, representing a final goal to be achieved;

set a second logical formula, in the form of the temporal logic, representing a subgoal based on the abstract states and the first logical formula, the subgoal indicating an intermediate goal for achieving a final goal or constraint conditions required to achieve the final goal;

generate an integrated logical formula in the form of the temporal logic by combining the first logical formula and the second logical formula by logical AND; and generate an operation sequence to be executed by the robot based on the integrated logical formula, wherein the robot operates to execute the objective task under control of the control device, a robot control device of the robot performs operation control of each of a plurality of robotic arms of the robot based on a subtask sequence, and the first logical formula and the second logical formula are generated and then combined via logical AND to generate the integrated logical formula before the robot is controlled.

8. The control device according to claim 1,
wherein the first logical formula includes the logical formula of a constraint condition regarding an interference between objects in the workspace.

9. The control device according to claim 2,
wherein the at least one processor is configured to execute the instructions to:

determine a number of the time steps of the time step logical formula based on a prospective work time designated by a user input.

10. The control device according to claim 9,
wherein the at least one processor is configured to execute the instructions to:

set the number of the time steps to a predetermined initial value; and gradually increase the number of the time steps until the time step logical formula is generated.

* * * * *